United States Patent [19]

Boudreau

[11] 4,295,490
[45] Oct. 20, 1981

[54] MILKING APPARATUS

[76] Inventor: Archie E. Boudreau, P.O. Box 1125, Modesto, Calif. 95353

[21] Appl. No.: 65,172

[22] Filed: Aug. 9, 1979

Related U.S. Application Data

[62] Division of Ser. No. 906,425, May 16, 1978, Pat. No. 4,198,999.

[51] Int. Cl.³ .............................................. F16K 11/10
[52] U.S. Cl. .................................... 137/595; 137/205; 137/240; 137/635; 137/863; 137/869; 137/DIG. 8
[58] Field of Search ........... 137/205, 240, 595, 596.15, 137/635, 863, 869, DIG. 8

[56] References Cited

U.S. PATENT DOCUMENTS

| | | | |
|---|---|---|---|
| 2,612,185 | 9/1952 | Allen | 137/635 |
| 3,918,161 | 11/1975 | Morgan et al. | 433/100 X |

*Primary Examiner*—Gerald A. Michalsky
*Attorney, Agent, or Firm*—Phillips, Moore, Weissenberger, Lempio & Majestic

[57] ABSTRACT

A milking apparatus is disclosed for automatically providing the appropriate amount of vacuum for purposes of milking a cow throughout the entire milking operation. The milking apparatus includes a fluid control valve system having a controller unit and a discharge valve in fluid communication with a collection jar. The controller unit is further adapted for communication with a source of vacuum, and the collection jar is adapted to be in communication with the cow such that the vacuum can draw milk from the cow into the collection jar. The discharge valve is further adapted for communication with a source of vacuum for drawing the milk through the discharge valve. Further the fluid control valve system includes a first pilot vacuum signal conduit for providing communication between the controller unit and the discharge valve, the discharge valve selectively providing communication between the collection jar and the source of vacuum for selectively discharging milk from the collection jar through the discharge valve upon pilot vacuum signal from the controller unit. The discharge valve includes a vacuum sensing means for sensing when the collection jar is fully discharged, the vacuum sensing means being in communication with the controller unit through a second pilot signal conduit for signaling the controller unit when the collection jar is fully discharged, the control unit then selectively closing the discharge valve. An aspect of the invention includes the controller unit having a plurality of individual plates, each having at least first and second surfaces, which plates are mateable one to another in a prearranged order such that the first surface of one plate is mateable with the second surface of an adjacent plate, and wherein said plates include vacuum channels defined in at least some of the surfaces thereof.

14 Claims, 32 Drawing Figures

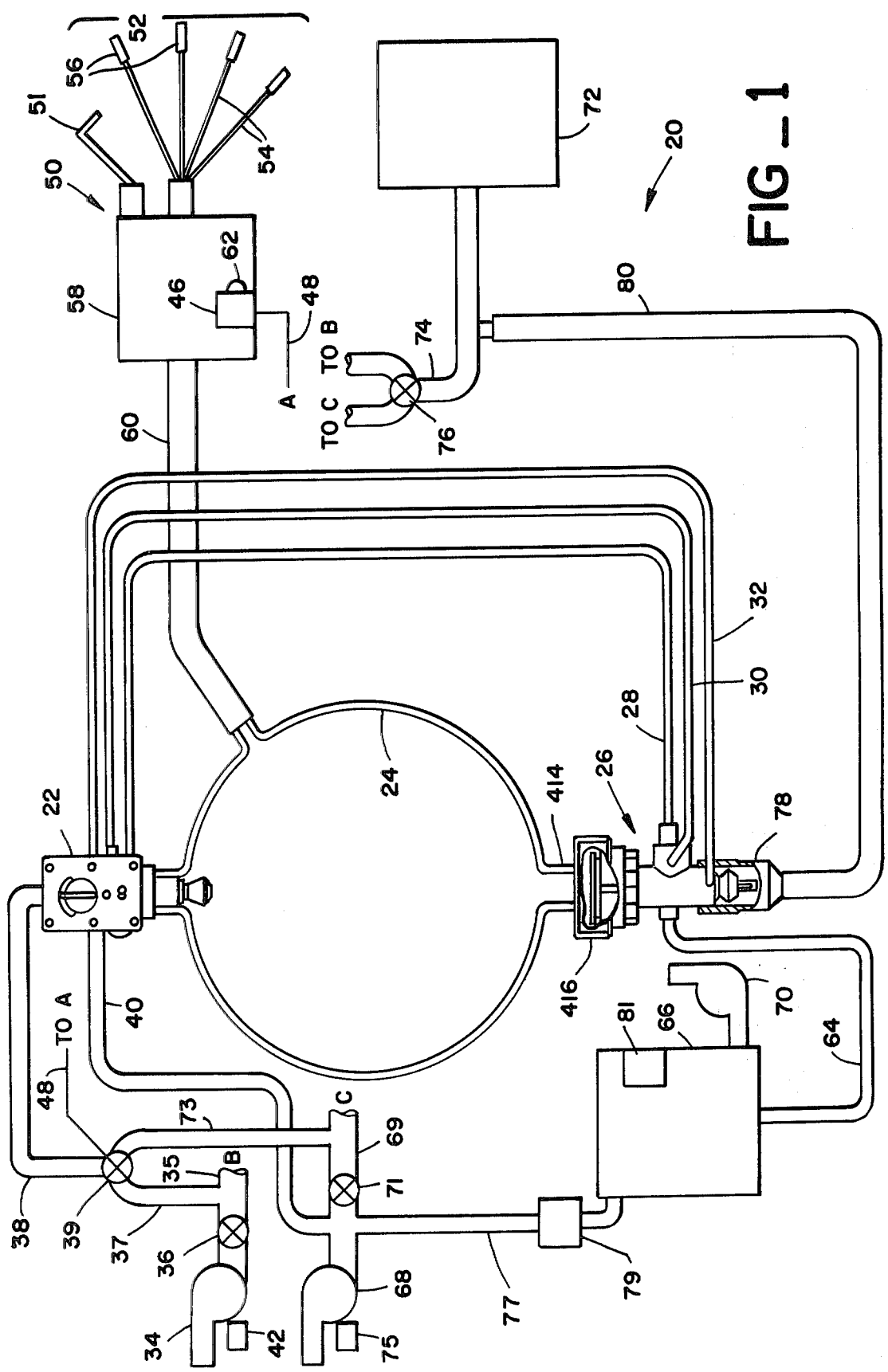
FIG_1

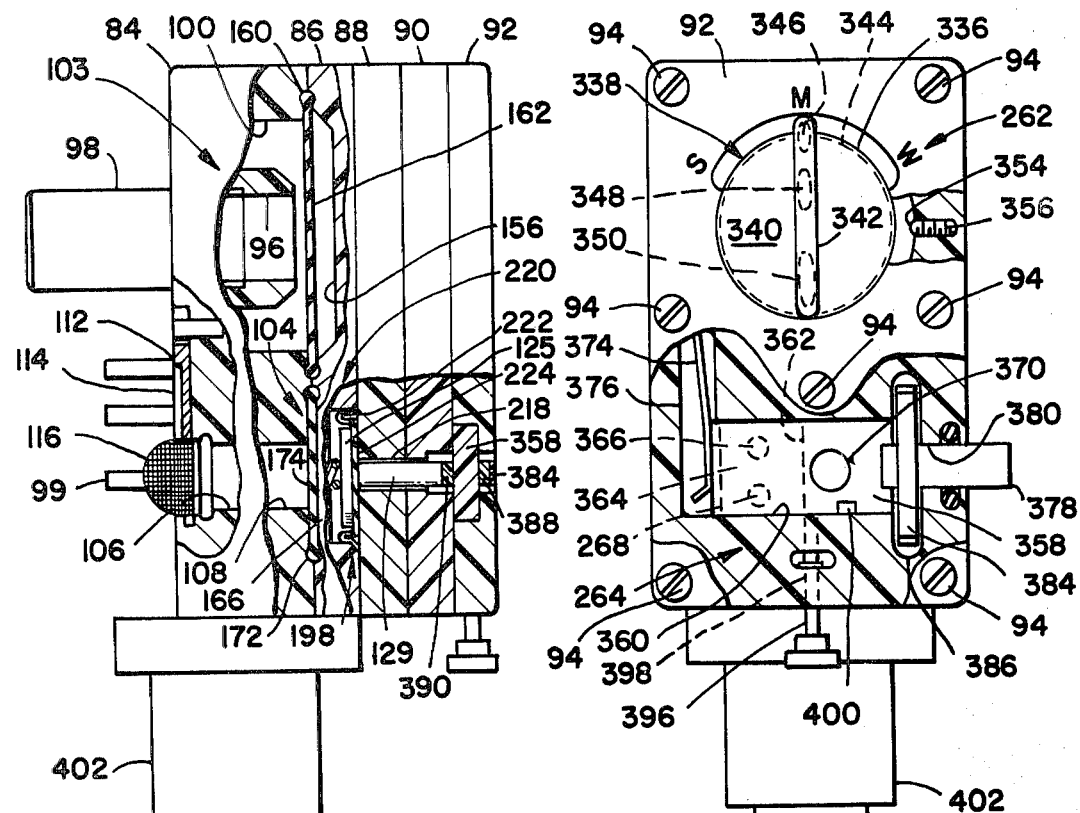
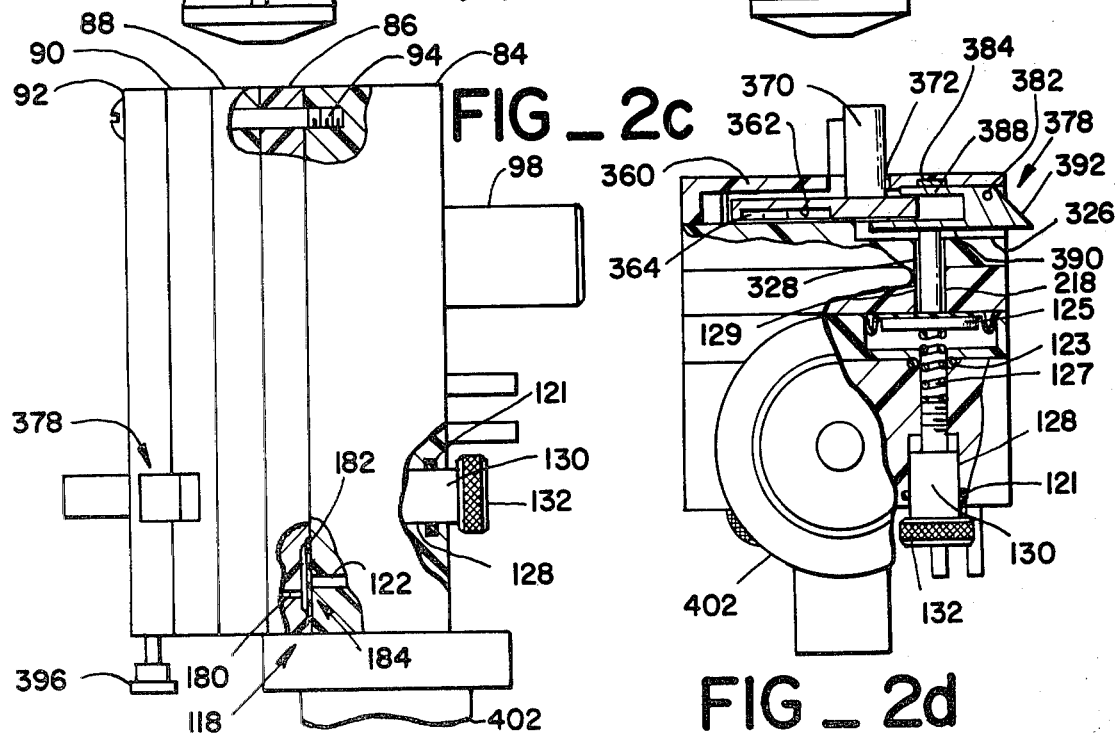

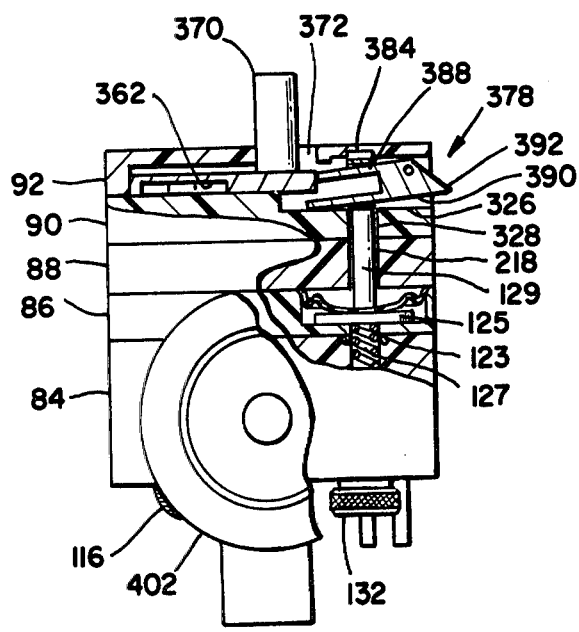
FIG_2e
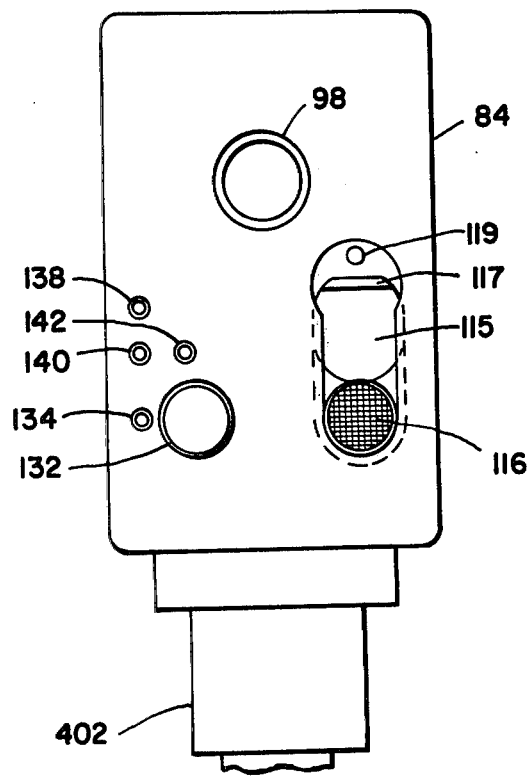
FIG_2f

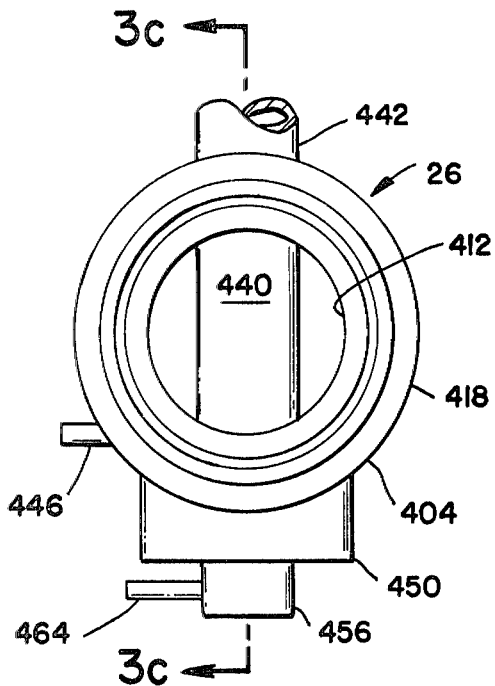
FIG_3b
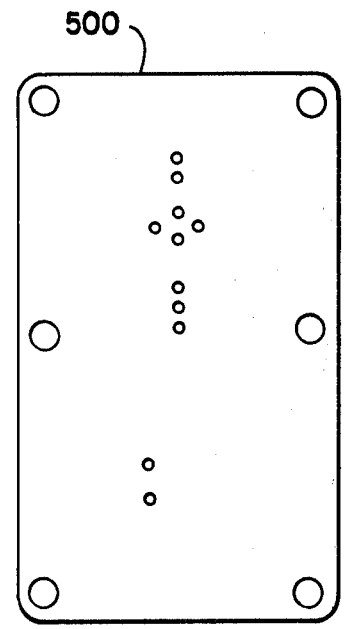
FIG_12
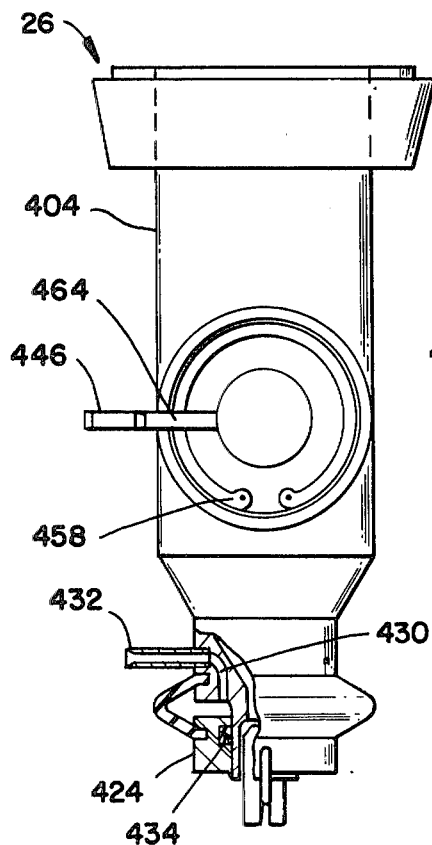
FIG_3a
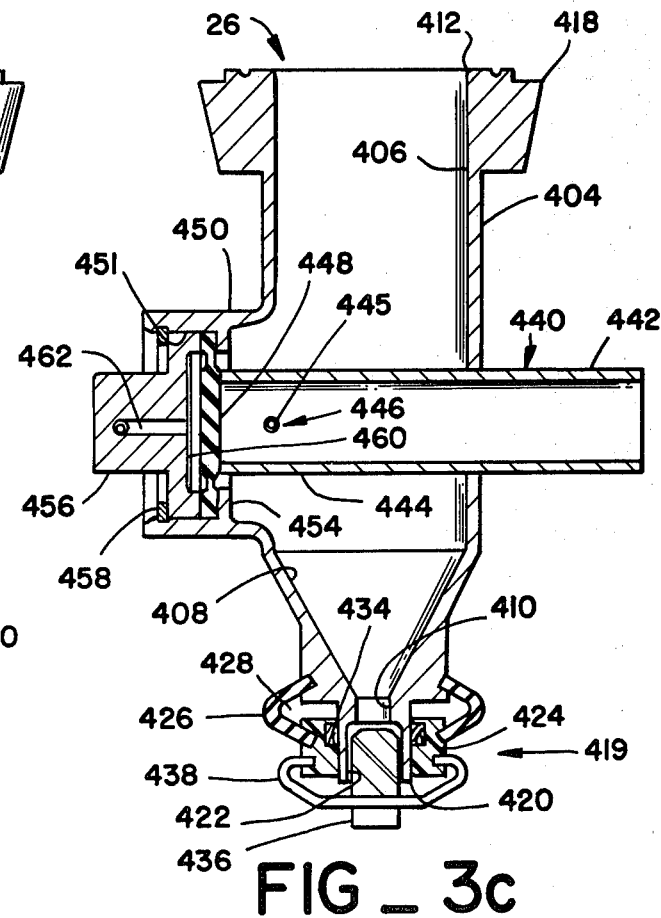
FIG_3c

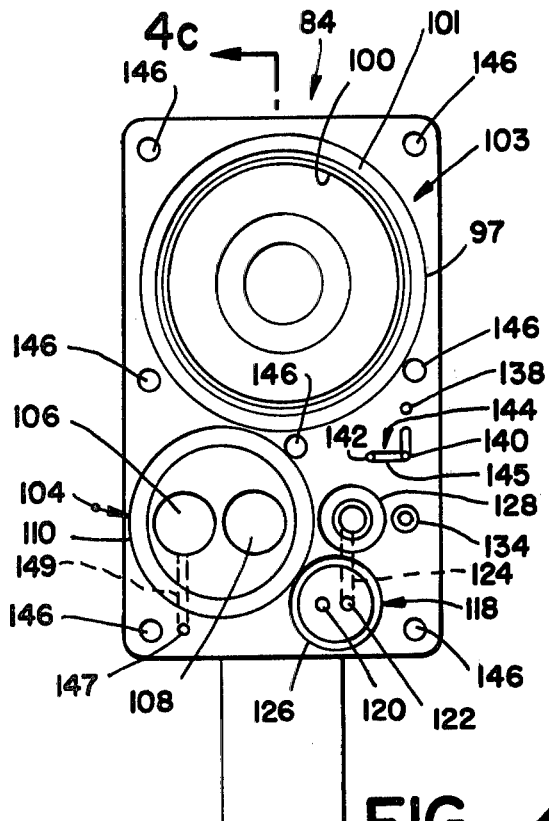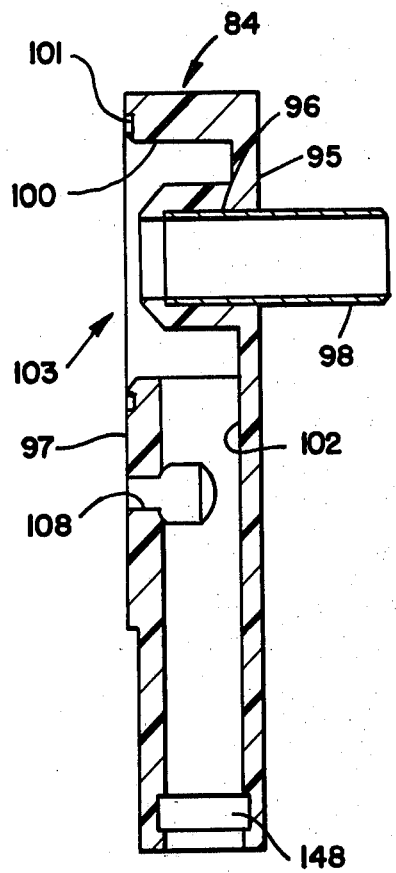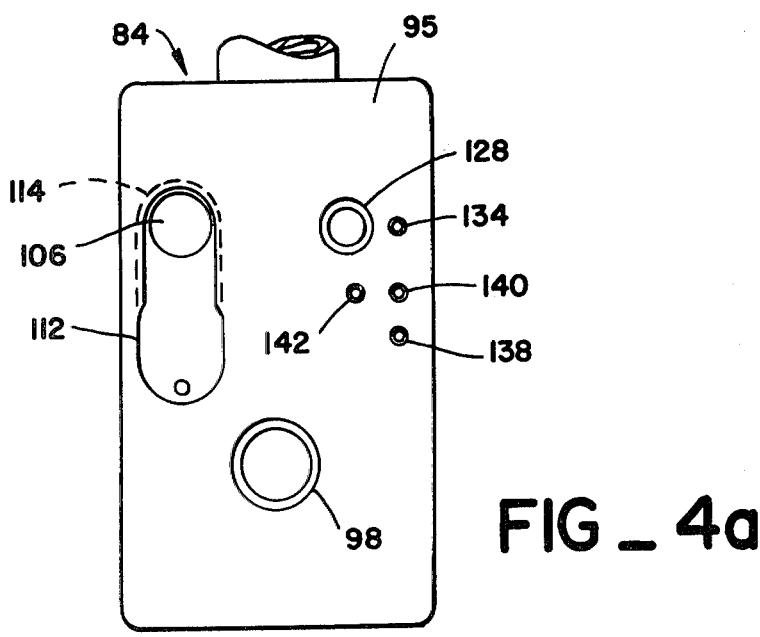

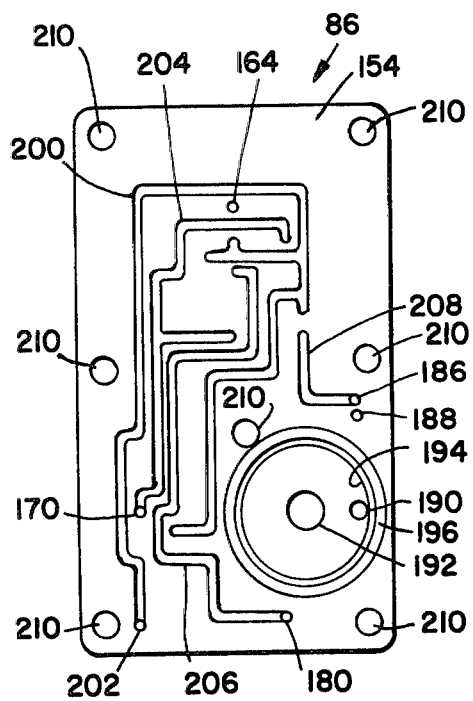
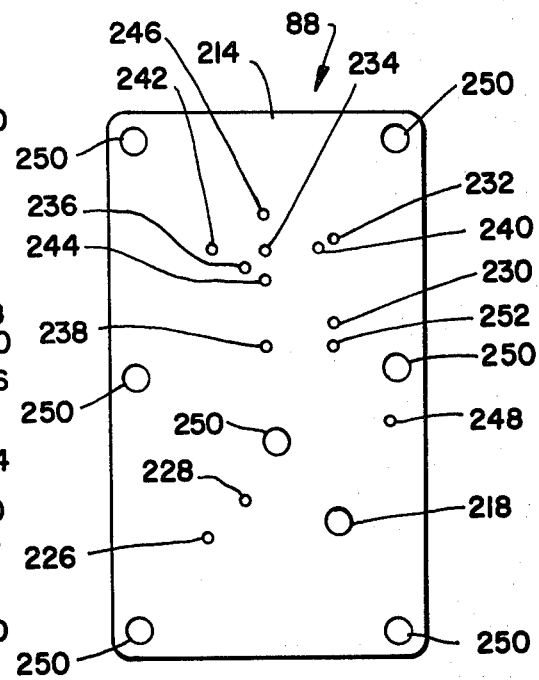
FIG_5b  FIG_6b
FIG_5c  FIG_6c
FIG_5a  FIG_6a

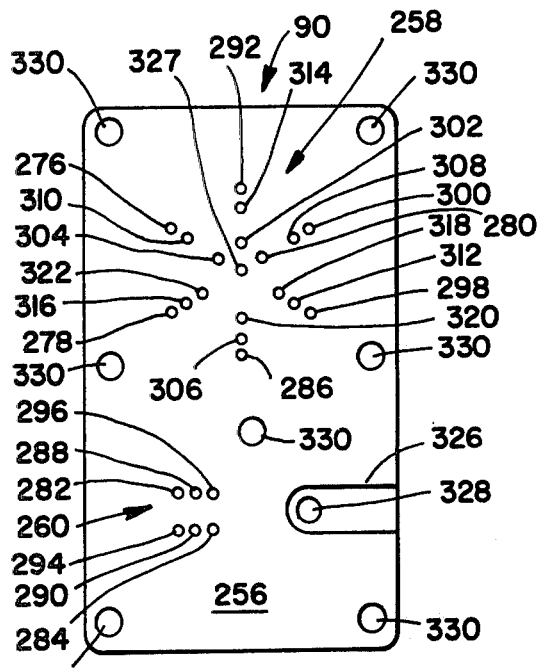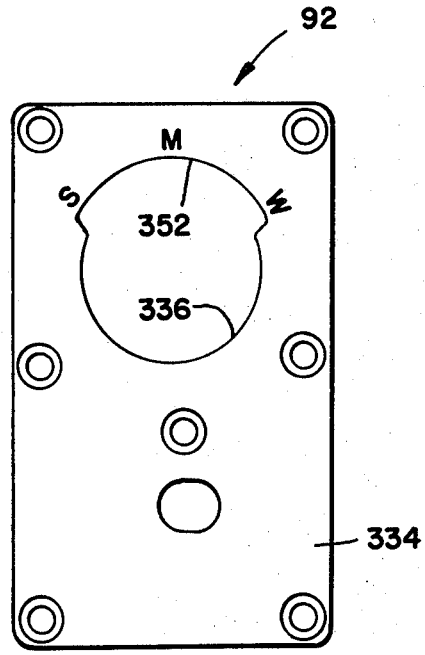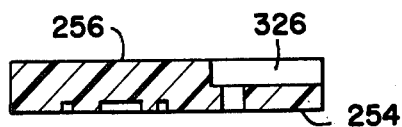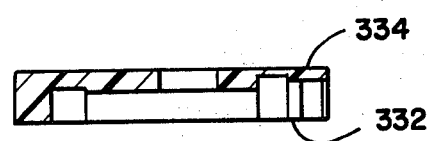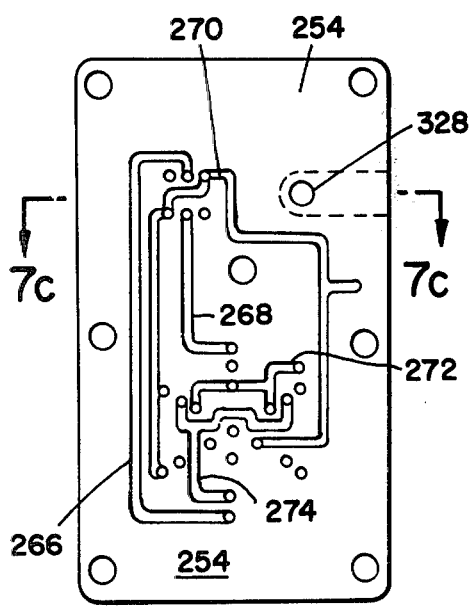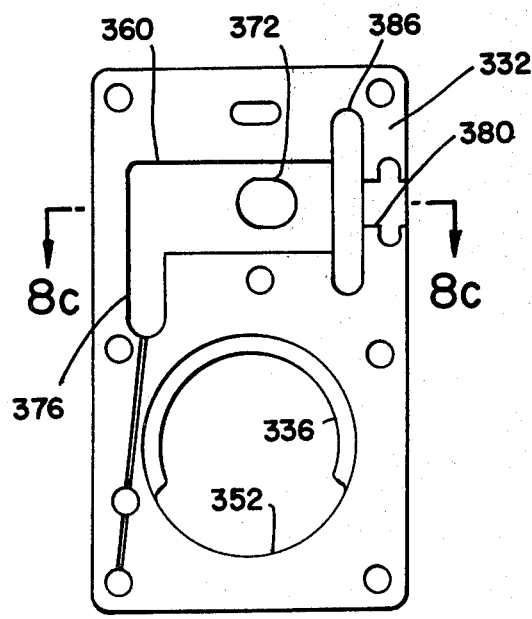

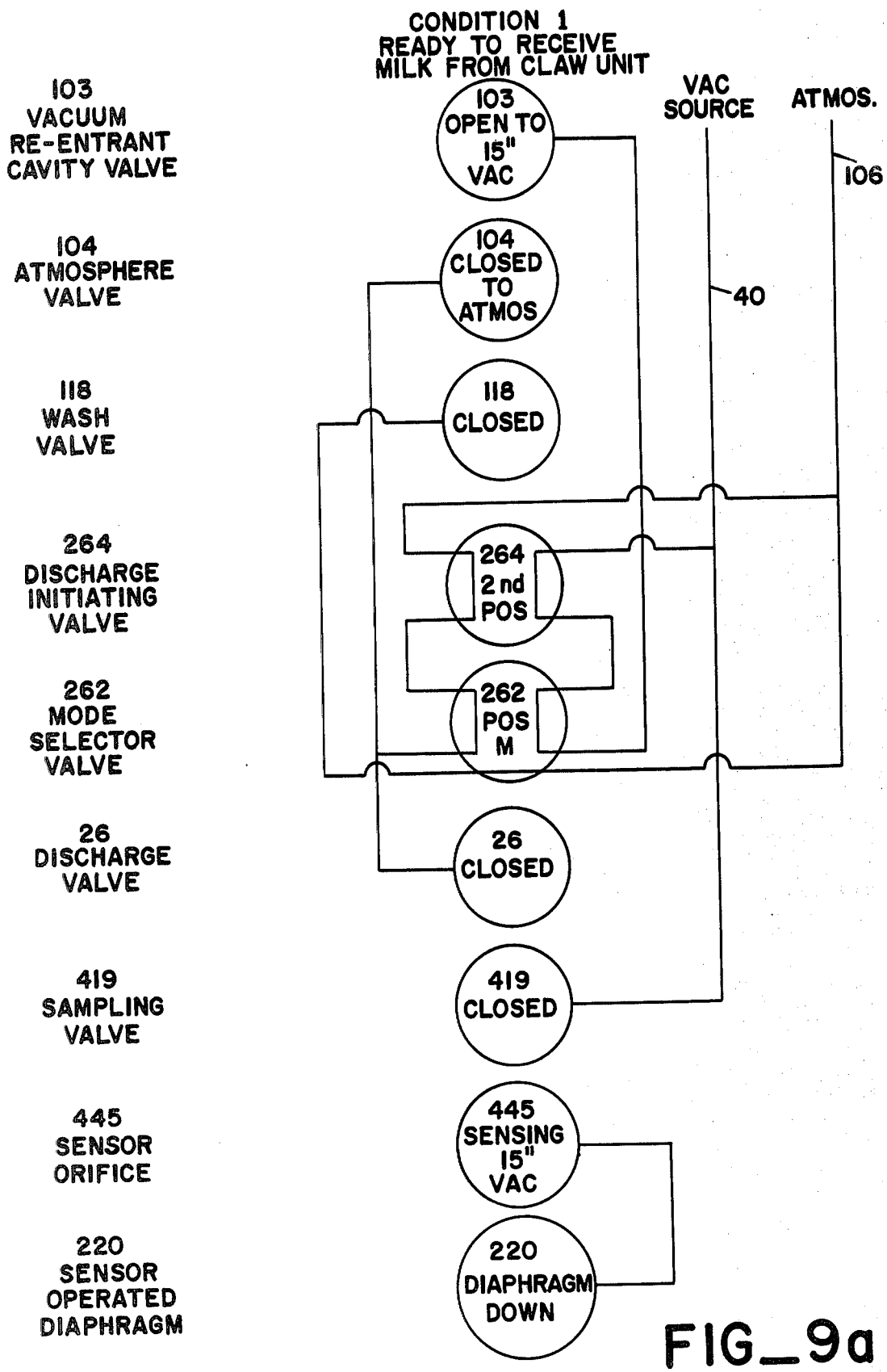
FIG_9a

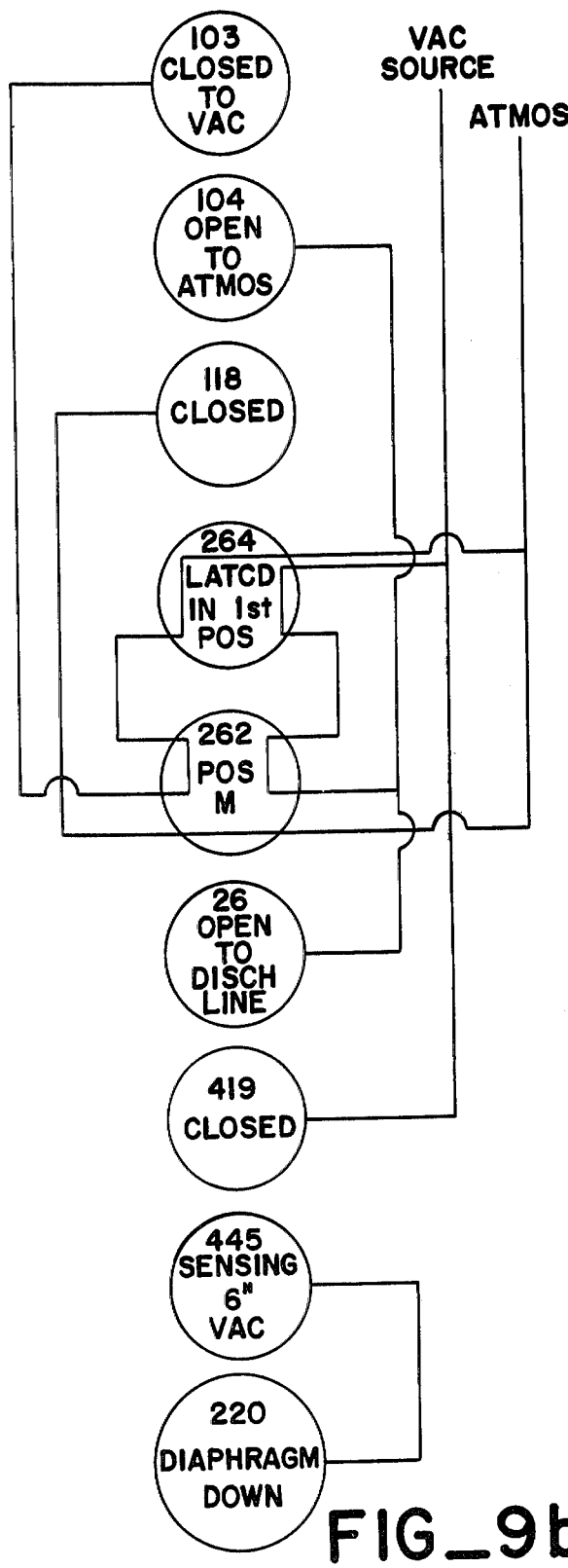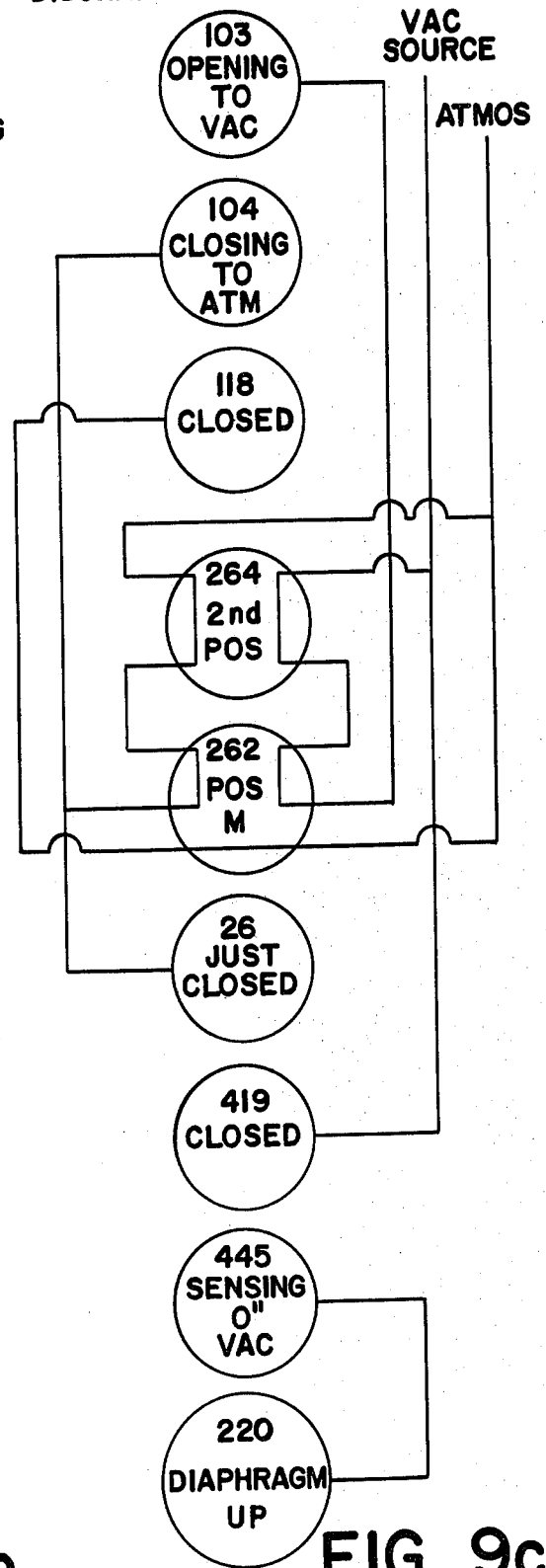
FIG_9b
FIG_9c

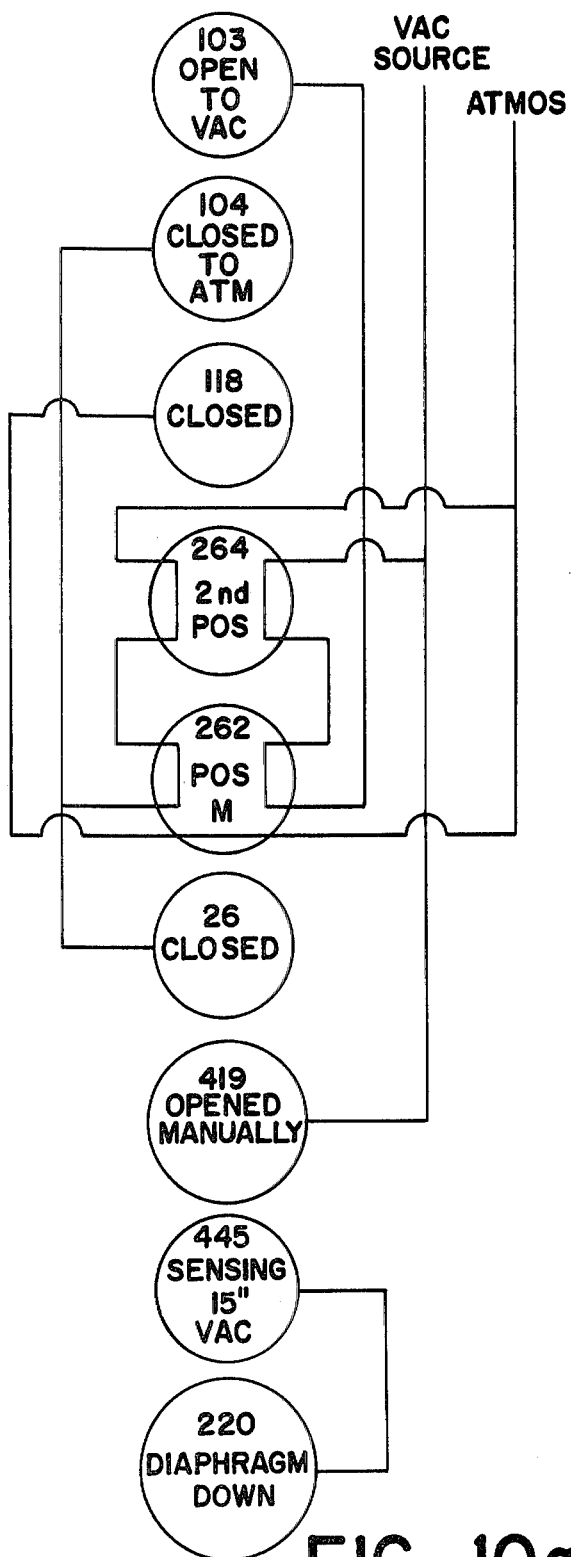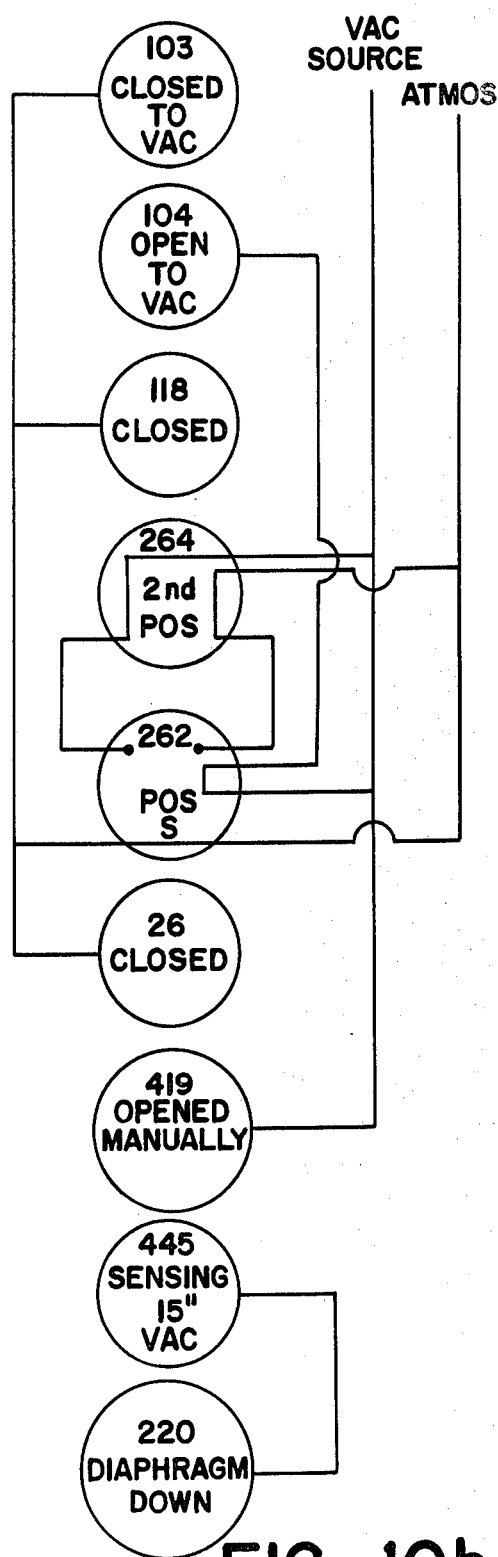

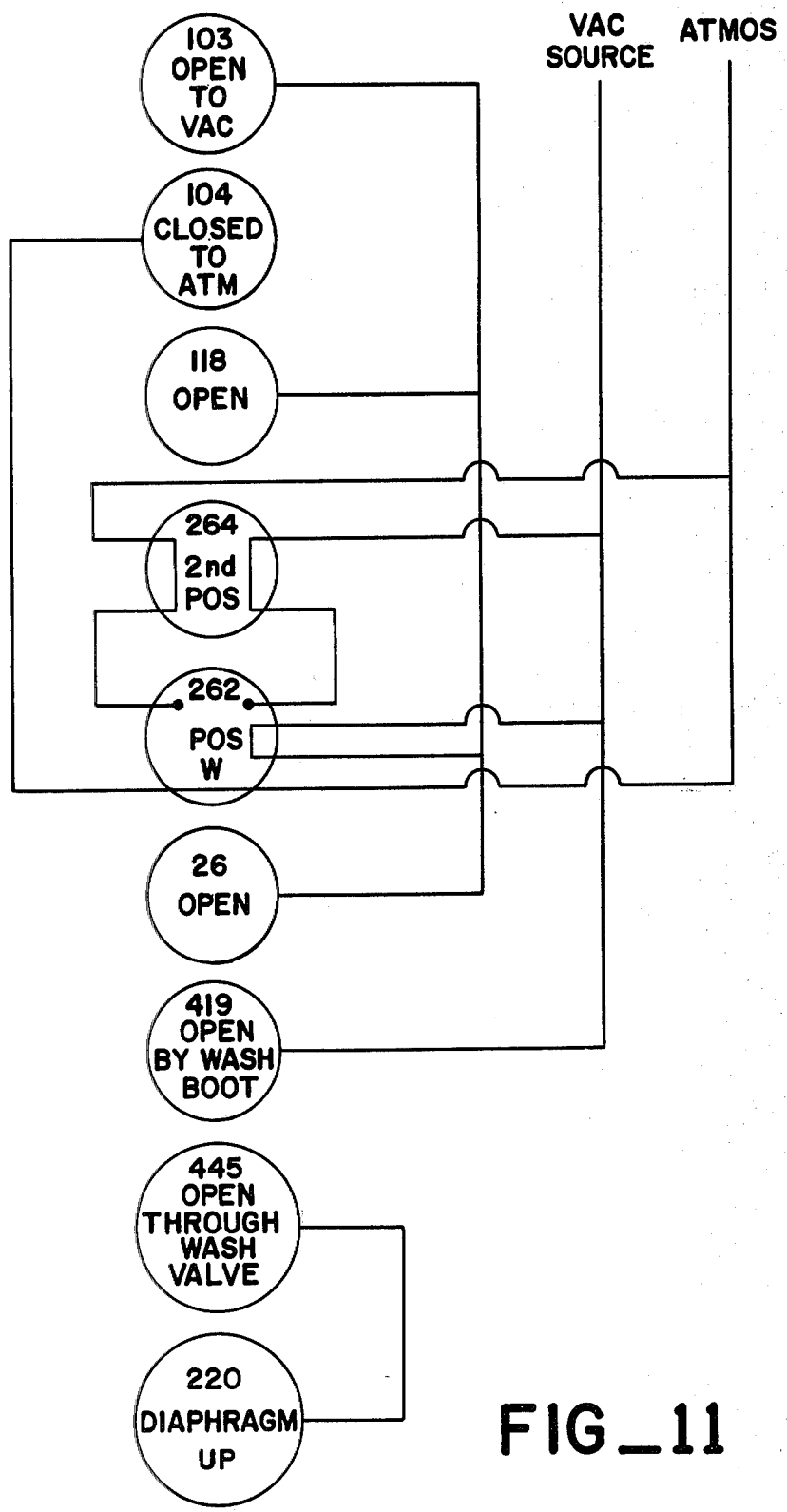
FIG_11

MILKING APPARATUS

This is a division of Ser. No. 906,425, filed May 16, 1978, now U.S. Pat. No. 4,198,999.

BACKGROUND OF THE INVENTION

The present invention relates to a milking apparatus including a fluid control valve system having in fluid communication a controller unit, a collection jar, and a discharge valve, and more particularly, a fluid control valve system having a vacuum sensing means for signaling the controller unit to close the discharge valve when fluid from the collection jar has been completely discharged through the discharge valve.

It is known in the prior art to have a milking apparatus which includes a valve unit, a collection jar and a discharge valve, all in fluid communication. A source of vacuum is provided in communication with the valve unit and with a discharge line of the discharge valve. Further the collection jar is provided in fluid communication with a claw unit having four teat cups, which teat cups are positionable for drawing milk from, for example, the udder of the cow. Generally the claw unit is associated with a flow meter which provides a signal for regulating the strength of the source of vacuum. When the volume of milk flowing from the cow diminishes to a given point, the flow meter signals a regulator associated with the source of vacuum, thereby initiating a reduction in the strength of the vacuum provided to the valve unit, to the collecting jar and to the claw for drawing milk from the udder of a cow. Such reduction in the amount of vacuum is necessary so that the cow udder does not become irritated, which irritation can give rise to udder disorders.

In the collection jar, the collected milk can be inspected and there are provisions incorporated into the discharge valve for sampling the collected milk. Once the milk collected in the collection jar has been inspected, the milk can be dumped through the discharge valve to a receiving jar by first closing a first conduit which provides communication between the source of vacuum and the valve unit and opening a second conduit so that the valve unit and the collecting jar are exposed to atmospheric pressures. Then, the discharge valve is opened and the source of vacuum draws the milk from the collection jar through the discharge valve into the receiving jar.

In order to reset the milking apparatus for milking another cow, the discharge valve must be closed and the collection jar must again be placed in communication with the source of vacuum, the conduit providing communication between the atmosphere and the valve unit also must be closed. The above-indicated procedure requires time to accomplish, time which the operator might more profitably spend, for example, preparing the next cow for milking or performing one of the other functions required during the milking operation. Further, as often is the case, the operator will inadvertently forget to close the discharge valve after the collection jar has been completely emptied of milk. The operator will, however, preparatory to milking the next cow, place the source of vacuum in communication through the valve unit, and thus with the collection jar and with the claw unit. As milking of a second cow begins, it can be seen that since the discharge valve still communicates with the collection jar, that the milk will flow from the claw unit through the collection jar and through the discharge valve to the receiving jar. While such a procedure might be acceptable when there is no need to inspect the milk drawn from the cow, prior to the transfer of the milk from the collection jar to the receiving jar, it is highly undesirable to have the discharge valve and thus the collection jar in communication with the source of vacuum as the flow of milk from the cow is diminishing. The reason for this is that even though the strength of the vacuum provided through the valve unit will be diminished by the regulator as the flow of milk diminishes, so as to prevent udder disorder, the strength of the vacuum provided through the discharge valve which is inadvertently provided in communication with the claw unit will not be diminished. Thus, the inadvertence of the operator in leaving the discharge valve open, will cause an undiminished source of vacuum to continue drawing milk from the udder. With vacuum so provided to the claw unit, the cow udder will become irritated and thus udder disorders are likely.

Another problem associated with prior art devices is that not only, as has been previously described, is there no provision for automatically closing the discharge valve preparatory to the next milking, but also there is no provision for automatically and immediately closing said discharge valve after milk from the collection jar has passed therethrough. Such an arrangement is necessary to prevent slugs of air from the collection jar from being drawn into the receiving jar, causing the milk therein to spin around at a rapid rate.

Further, the prior art milking apparatus has a valve unit which comprises a plurality of valves provided in communication with appropriate conduits. Use of such valves, such valves not being in a compact unit, proves sometimes to be troublesome. Further, there is a possibility that the valves could be incorrectly connected and that although correctly connected, could be inadvertently and mistakenly disconnected during operation.

Further, it is noted that during a sampling mode wherein samples of the milk collected in the collection jars are taken and the washing mode wherein the entire milking apparatus is washed, the above-indicated valves must be operated, although in a different sequential order. Thus, the operator must remember the operating orders for the valves for the sampling, and the cleaning modes, as well as the previously described milking mode.

SUMMARY OF THE INVENTION

The present invention is directed to overcoming one or more of the problems as set forth hereinabove.

According to the present invention, a fluid control valve system includes a controller unit adapted for communication with a source of vacuum and with a collection jar, which collection jar is in turn adapted for communication with a source of fluid. The vacuum source can draw fluid from the fluid source into the collection jar. The fluid control valve system further includes a discharge valve adapted for communication with the collection jar, and further adapted for communication with the source of vacuum for drawing the fluid through the discharge valve. A first pilot vacuum signal conduit, for providing communication between the controller unit and the discharge valve, is also provided, such that upon pilot vacuum signal from the controller unit, the discharge valve selectively provides communication between the source of vacuum and the collection jar. The discharge valve further includes a vacuum sensing means for sensing when the collection jar is fully discharged, said vacuum sensing means being in communication with said controller unit through a second pilot vacuum signal conduit for signaling the controller unit when the collection jar is fully discharged, said controller unit then selectively closing said discharge valve.

A further aspect of the fluid control valve system includes a controller unit which has a plurality of individual plates each having at least first and second surfaces which plates are mateable one to another in a prearranged order such that the first surface of one plate is mateable with the second surface of an adjacent plate. The plates include vacuum channels defined in at least some of the surfaces thereof.

A further aspect of the invention includes the controller unit having a switch for selecting among a milking, a sampling and a washing mode.

Thus it becomes evident that the invention overcomes the disadvantages of the prior art by providing for the closing of the discharge valve once fluid has been completely discharged from the collection jar and by providing for a compact controller unit having a signal switch for selecting between the milking, sampling and washing modes, both provisions preventing the possibility of operator error and increasing the speed and operation of the milking apparatus.

BRIEF DESCRIPTION OF THE DRAWINGS

The foregoing and other features of the invention will becomes apparent from the following detailed description of the preferred embodiment when read in conjunction with the attached drawings wherein:

FIG. 1 is a schematic view of the milking apparatus of the invention.

FIGS. 2a through 2f depict front elevation, left side elevation, right side elevation, two bottom and back elevational views, respectively, all except FIG. 2f partially broken away and sectioned, of the controller unit of the invention.

FIGS. 3a and 3b depict side elevation and bottom views of the discharge valve of the invention.

FIG. 3c depicts a sectional view taken through line 3c—3c of FIG. 3a.

FIGS. 4a and 4b depict front and back side elevational views of the first block unit of the controller unit of FIGS. 2a-f.

FIG. 4c depicts a cross-sectional view taken through line 4c—4c in FIG. 4b.

FIGS. 5a and 5b depict front and back side elevational views of the second block of the controller unit of FIGS. 2a-f.

FIG. 5c depicts a sectional view taken through line 5c—5c in FIG. 5a.

FIGS. 6a and 6b depict front and back side elevational views of the third block of the controller unit of FIGS. 2a-f.

FIG. 6c depicts a sectional view taken through line 6c—6c in FIG. 6a.

FIGS. 7a and 7b depict front and back side elevational views of the fourth block of the controller unit of FIGS. 2a-f.

FIG. 7c depicts a cross-sectional view taken through line 7c—7c of FIG. 7a.

FIGS. 8a and 8b depict front and back side elevational views of the fifth block of the controller unit of FIGS. 2a-f.

FIG. 8c ddepicts a cross-sectional view taken through line 8c—8c of FIG. 8a.

FIGS. 9a through 9c depict schematic flow diagrams of three sequential states of the milking operation of the milking apparatus of the invention.

FIGS. 10a and 10b depict schematic flow diagrams of two sequential stages of the sampling operation of the milking apparatus of the invention.

FIG. 11 depicts a schematic flow diagram showing the washing mode of a milking apparatus of the invention.

FIG. 12 depicts a shim which can be provided between the blocks of the invention.

DETAILED DESCRIPTION OF THE PREFERRED EMBODIMENT

With reference to the figures and in particular to FIG. 1 there is shown a dual vacuum fluid control valve system of the milking apparatus of the invention, which control valve system is generally denoted by 20. Fluid control valve system 20 includes a controller unit 22 in fluid communication with a collection jar or weigh jar (as is noted in the trade) 24, which collection jar 24 is also in fluid communication with a discharge valve 26. Further, three vacuum conduits, discharge valve vacuum conduit 28, sensor vacuum conduit 30 and the drain vacuum conduit 32 are provided in fluid communication with controller unit 22 and discharge valve 26. The purpose of the aforementioned three vacuum conduits will become apparent later on in the specification when the controller unit 22 and the discharge valve 26 are discussed in much greater detail.

Still viewing FIG. 1, a first vacuum pump 34 is provided in fluid communication with a first vacuum line 35, which vacuum line 35 has a cutoff valve 36 and communicates with the controller unit 22 through a first vacuum feeder line 37, a vacuum selector valve 39, and a main vacuum supply line 38. Cutoff valve 36 is located intermediate pump 34 and line 37. First vacuum pump 34 is regulated by regulator 42 so as to maintain 10" $H_g$ in first vacuum line 35.

A second vacuum pump 68 is provided in fluid communication with a second vacuum line 69 which includes cutoff valve 71. A second vacuum feeder line 73 provides communication between vacuum line 69 and valve 39, the cutoff valve 71 positioned intermediate line 73 and pump 68. A regulator 75 maintains vacuum in line 69 at 15" $H_g$.

Further a pilot vacuum supply line 40 provides fluid communication between second vacuum line 69, intermediate pump 68 and check valve 71, and controller unit 22. Again, the significance of vacuum supply lines 38 and 40 will become apparent with the more detailed discussion of the controller unit 22 hereinbelow.

Vacuum selector valve 39 is controlled by and provided in communication with a flow meter 46 by an electrical conduit 48. As depicted in FIG. 1, a first portion of conduit 48 is shown in communication with valve 39 and a second portion of conduit 48 is shown in communication with flow meter 46, the complete conduit 48 not being shown for purposes of maintaining drawing simplicity. However, it is to be understood that these two portions of conduit 48 are provided in electrical communication.

Flow meter 46 is provided associated with a claw unit 50, which claw unit 50 includes four teat cup units, collectively denoted 52. Each teat cup unit 52 comprises a vacuum conduit 54 for providing fluid communication between a teat cup 56 and the base 58 of the claw unit 50. Further, it is noted that a vacuum conduit 60 is provided for placing the claw unit 50 and thus the teat cup unit 52 in fluid communication with the collection jar 24. Also, it is noted that a signal light 62 is provided in communication with flow meter 46 for indicating a change in flow of milk, and in particular a reduction in the flow of milk, from, for example, a cow, through the claw unit 50 into the collection jar 24. As will be discussed later in the operation of the invention, as the flow of milk from the cow begins to decrease to a predetermined level during the end of the milking cycle, the signal light 62 will indicate the reduced flow, and the flow meter 46 will signal the vacuum selector valve 39 to reduce the amount of vacuum in vacuum supply line 38 from 15" $H_g$ to 10" $H_g$ so that the cow does not develop udder disorders.

It is to be understood that each teat cup 56 is constructed in such a way that when placed about the teat of a cow, it acts on said teat through a membrane (not shown), placed adjacent the teat, with an undulating motion, simulating the hand motion required to physically milk the cow. The undulating motion of the membrane is produced by vacuum supplied to the teat cup which vacuum also carries the milk to the collection jar 24.

Also associated with claw unit 50 is an arm member 51 and an arm member actuation mechanism 53, which arm member 51 with a sweeping motion dislodges and gathers the teat cups from the cow after a time delay of generally twenty to twenty-five seconds, in a preferred embodiment, from the signal of signal light 62.

Viewing the discharge valve 26 in FIG. 1, it is evident that a discharge line 64 provides fluid communication between the discharge valve 26 and a receiving jar, or collection vessel, 66, which receiving jar 66 is provided for collecting the milk from the collection jar 24 once such milk has been inspected, as discussed hereinbelow in the operation of the apparatus, and discharged through discharge valve 26. Further, a third vacuum line 77 is provided in fluid communication with receiving jar 66 and with second vacuum line 69 intermediate cutoff valve 71 and second vacuum pump 68 to provide an evacuated environment inside receiving jar 66 and thus to draw milk from collection jar 24 through discharge line 64 into receiving jar 66 once the discharge valve 24 is opened. An overflow vessel 79 is provided in fluid communication with third vacuum line 77 so as to catch any overflow from receiving jar 66 in order to protect second vacuum pump 68. Also, it is noted that a fluid pump 70 is provided in fluid communication with receiving jar 66 to pump the milk received therein through filtering and cooling apparatus preparatory to the milk being pasteurized and further processed. A float mechanism 81 is provided in receiving jar 66 and operably associated with pump 70 by electrical conduit 83, which float mechanism 81 actuates pump 70 when milk in receiving jar 66 is at a predetermined level.

Still viewing FIG. 1, it can been seen that wash unit 72 is provided, which wash unit 72 is selectively placed in fluid communication with first and second vacuum lines 35 and 69 by a vacuum conduit 74 having a check valve 76 provided therein. Further, a wash boot 78 is provided in fluid communication with the wash unit 72 by a wash conduit 80. Wash boot 78 is adapted to fit in fluid communication with discharge valve 26 preparatory to the washing of the milking apparatus. The actual washing process and the manner in which the wash boot 78 is adapted to accommodate the discharge valve 26 will be discussed hereinbelow.

MILKING APPARATUS CONTROLLER UNIT

Considering FIGS. 2a through 2f, controller unit 22 is depicted in greater detail. As can be seen in these figures, control unit 22 comprises a plurality of blocks having generally rectangular surfaces. The plurality of blocks includes first block 84, second block 86, third block 88, fourth block 90, and fifth block 92, said blocks being held in an intimate side-by-side relationship by machine bolts 94 as depicted in FIG. 2a. It is noted that before the blocks 84 through 92 are assembled, a silicon vacuum grease may be applied to adjacent surfaces of blocks 84 through 92 so as to assist in the formation of a vacuum seal between said surfaces.

All of the above-indicated blocks are comprised of a plastic material which may be machined, in a preferred embodiment, such that the machining defines the various passages, bores, and channels as shown in FIGS. 1, 2 and 4–8. Alternately, it can be appreciated that these blocks 84 through 92 can be formed by molding. It is noted that owing to the nature of the molding process, shrinkage can occur in the areas between the passages and channels. Thus, in order to accomplish adequate sealing of said passages and channels, shims 500 (FIG. 12), and preferably metallic shims 500 having parallel surfaces, are disposed between the aforementioned blocks 84 to 92. These shims 500 have apertures and bores provided therein for providing the necessary communication between the respective blocks, but otherwise, block communication between blocks.

Considering each block in turn, first block 84, (FIGS. 2b, 2c, 2f and 4a through 4c) defines a bore 96 which receives a vacuum conduit 98, which in a preferred embodiment is comprised of stainless steel. Vacuum conduit 98 can be placed in fluid communication with the main vacuum supply line 38 (FIG. 1). As can be seen in FIGS. 2b and 4c, bore 96 extends into a re-entrant cavity 100 of a re-entrant valve 103. The re-entrant cavity 100 includes a bottom wall and cylindrical side walls formed generally in the shape of a cup. In a preferred embodiment the diameter of re-entrant cavity 100 as measured between opposed points on the cylindrical side walls is larger than the diameter of bore 96, for reasons which will be discussed in the operation of the invention found hereinbelow.

Re-entrant cavity 100 is in fluid communication with vacuum conduit 102, which conduit 102 is partially defined by first block 84, and which conduit 102 includes a portion which extends outwardly from first block 84.

Also defined by first block 84 is an atmospheric valve 104. Atmospheric valve 104 includes first and second generally parallel bores 106 and 108, bore 106 providing fluid communication between first side surface 95 and second side surface 97 of first block 84, and second bore 108 providing fluid communication between second side 97 of first block 84 and vacuum conduit 102. Further, second side 97 defines an annular groove provided therein which circumscribes first and second bores 106 and 108. As can be seen in FIGS. 4a and 2b, an elongated recess 112 is provided in first surface 95 so as to be in fluid communication with first bore 106 of atomspheric valve 104. A portion of the elongated recess 112 includes an undercut 114, denoted by broken lines in FIG. 4a and shown in section in FIG. 2b. A replaceable filter 116 (FIG. 2b) for filtering atmospheric air drawn therethrough into first bore 106 is adapted for snapping directly into recess 112 adjacent first bore 106.

Undercut 114 (FIG. 2f) is adapted to receive a sliding door 115, having a turned-over upper lip 117 for facilitating the movement of said door 115 in recess 112. Once door 115 is properly positioned in recess 112, pin 119 is driven into an appropriate bore provided in recess 112 to prevent the removal of door 115. As will be discussed during the operation of the apparatus, when air filter 116 becomes clogged, atmospheric valve 104 becomes inoperative. The removal of air filter 116 from recess 112 allows sliding door 115 to slide downwardly into a blocking relationship with bore 106 so as to maintain atmospheric valve 104 in an inoperative state until door 115 is slid upwardly and a cleaned air filter 116 is snapped into place. Thus, door 115 insures that the operator of the apparatus will remember to replace a clogged filter 116 with a clean one, otherwise controller unit 22 will not function properly.

First block 84 further defines a wash valve 118. Wash valve 118 includes bores 120 and 122. Bore 120 provides fluid communication between the second side 97 of first block 84 and vacuum conduit 102. Bore 122 provides fluid communication between the second side 97 of first block 84 and a transverse bore 124 (shown in broken lines in FIG. 4b). Additionally, an annular groove 126 is defined by the second side 97 of first block 84 and circumscribes bores 120 and 122.

First block 84 further defines a bore 128, which includes internal threads adapted to receive an externally threaded shaft 130 having a knurled knob 132 (FIG. 2c). Bore 128 provides fluid communication between the first side 95 and the second side 97 of first block 84. Further, it is noted that the transverse channel 124 is in fluid communication with bore 128 and that externally threaded shaft 130 does not block communication between transverse channel 124 and bore 128. As is described in greater detail hereinbelow, knob 132 provides a sensitivity adjustment for the signal provided through sensor vacuum conduit 30. Furthermore, as can best be seen in FIG. 2d, O-rings 121 and 123 are provided in annular recesses in bore 128 for providing a vacuum seal.

First block 84 is further provided with a sensor vacuum bore 134 located adjacent bore 128, which bore 134 provides fluid communication between first and secnd sides 95 and 97 of first block 84. It is noted that the portion of bore 134 located adjacent the first side 95 of first block 84 is adapted for receiving, in a preferred embodiment, a stainless steel sleeve 99 (FIG. 2a). It is noted that this sleeve is adapted for receiving the sensor vacuum conduit 30 as depicted in FIG. 1.

First block 84 includes three additional bores, discharge valve bore 138, drain valve bore 140, and pilot vacuum supply line bore 142. Each of the bores, 138, 140, and 142, are adapted for receiving, in a preferred embodiment, a stainless steel sleeve (FIG. 2b), extending from the first side 95 of first block 84. Through the above-indicated appropriate sleeve, pilot vacuum supply line bore 142 is provided in fluid communication with pilot vacuum supply line 40, drain valve bore 140 is provided in fluid communication with drain vacuum conduit 32, and discharge valve bore 138 is provided in fluid communication with discharge valve vacuum conduit 28 (FIG. 1). Further, as can be viewed in FIG. 4b, an L-shaped surface channel is defined in the surface of second side 97 of first block 84. L-shaped surface channel 144 includes a first leg 145 which provides fluid communication between drain valve bore 140 and pilot vacuum supply line bore 142.

Also, first block 84 is provided with a plurality of threaded bores 146 which are adapted for receiving machine bolts 94 (FIG. 2a). Additionally, vacuum conduit 102 (FIG. 4c) includes an annular, recessed channel 148 located inside vacuum conduit 102 and distally from first block 84. Annular recessed channel 148 is adapted for receiving a deflector 150 (FIGS. 2a and 2b), discussed hereinbelow.

Second block 86 includes first and second sides 152 and 154 (FIGS. 5a, 5b and 5c). First side 152 defines a first circular recess 156, adapted for mating with re-entrant cavity 100 of first block 84. Further, an annular channel 158 is defined by first side 152 and circumscribes first circular recess 156. Annular channel 158 and annular channel 101 of first block 84 are adapted to receive a bulbous circumferential edge 160 of a circular, planar, flexible, diphragm member 162 (FIG. 2b) of re-entrant valve 103. A bore 164 is provided in second block 86 for providing fluid communication between the first circular recess 156 and the second side 154 thereof.

Second block 86 further includes a second circular recess 166 and an annular channel 168 circumscribed about second circular recess 166. A bore 170 is defined by second block 86 and provides fluid communication between the second circular recess 166 and the second side 154 thereof. With the first surface 152 of second block 86 and the second surface 97 of first block 84 mated together, annular channel 168 and annular channel 110 receive therebetween a bulbous circumferential edge 172 of a planar, flexible, diaphragm member 174 (FIG. 2b) of atmospheric valve 104. In a preferred embodiment, diaphragm member 174 as well as diaphragm member 162 and the other diaphragm members described hereinbelow are comprised of an elastomeric material.

Second block 86 further defines a third circular recess 176 and an annular channel 178 circumferential about third circular recess 176. Further, a bore 180 provides fluid communication between third circular recess 176 and the second side 154 of second block 86. Again, the bulbous edge 182 of a planar, flexible diaphragm member 184 of wash valve 118 is received between the annular channels 178 and 126 of adjacently positioned second and first blocks 86 and 84 respectively (FIG. 2c).

Second block 86 defines a discharge valve bore 186, a drain valve bore 188, a sensor vacuum bore 190, and a bore 192. With the second side 97 of first block 86 positioned adjacent the first side 152 of second block 86, the discharge valve bore 186, drain valve bore 188, sensor valve bore 190, and bore 192 are placed in fluid communication with the discharge valve bore 138, the L-shaped surface channel 144, the sensor vacuum bore 134, and the bore 128, respectively.

Second side 154 of second block 86 defines a circular recess 194 and an annular channel 196 circumferentially about circular recess 194. Both sensor vacuum bore 190 and bore 192 provide fluid communication between the first side 152 of second block 86 and circular recess 194.

The second side 154 also defines a recessed atmospheric channel 200 which is provided in communication with an atmospheric bore 202 which bore 202 provides fluid communication with first side 152 of second block 86 and which atmospheric bore 202 is provided in fluid communication with atmospheric bore 147 when the second side 97 of first block 84 is placed adjacent the first side 152 of second block 86.

The second side 154 further defines a recessed pilot channel 204 which communicates with bore 170, a recessed wash valve pilot channel 206 which communicates with bore 180, and an L-shaped discharge valve recessed channel 208 which communicates with discharge valve bore 186.

Referring to FIGS. 6a, 6b, and 6c, the first and second sides 212 and 214 of third block 88 are depicted. First side 212 defines an annular recess 216 circumferentially about a vacuum sensor valve bore 218. A flexible diaphragm 224 (FIG. 2b) of vacuum sensor valve 198 is positionably held between the annular recess 216 of first side 212 of third block 88 and the recessed annular channel 196 of the second side 154 of second block 86. As can be seen in FIG. 2b, the flexible diaphragm 224 has a generally U-shaped end portion 222 and a planar middle portion 224 disposed adjacent the open mouth of the U-shaped end portion 222 and thus disposed adjacent the first side 214 of third block 88.

Also as can best be seen in FIG. 2d, vacuum sensor valve 198 includes a circular disc 125, disposed in circular recess 194 between diaphragm 220 and a spring 127 provided through bores 128 and 192. Spring 127 contacts the end of shaft 130 and urges disc 125 and thus diaphragm 220 against third block 88. It is noted that valve 198 also includes a pin 129 provided through bores 218 and 328, which bores 218 and 328 are discussed below. Again as will be discussed later, the amount of compression placed on spring 127 by knob 132 determines the response sensitivity of valve 198 to the signal provided through sensor vacuum conduit 30.

Third block 88 defines a multiplicity of bores identified as follows which provide fluid communication between the first side 212 and second side 214. These bores include atmospheric bores 226, 228, 230, 232, 234, and 236. With the third block 88 placed adjacent the second block 86 the above-indicated atmospheric bores 226 through 236 communicate with recessed atmospheric surface channel 200 of second block 86. Further pilot bores 238, 240 and 242 are defined by third block 88 and communicate with recessed pilot channel 204 of second block 86 when third block 88 is placed adjacent thereto. Wash valve pilot bore 244 is defined by third block 86 and communicates with recessed wash valve pilot channel 206 when said third block 88 is placed adjacent second block 86. Also third block 88 defines another pilot bore 246 which communicates with pilot bore 164 in the second block 86. A pilot vacuum bore 248 is provided for communication with drain valve bore 188 in the above-indicated block figuration. Also a plurality of bores 250 are provided for receiving the shanks of machine bolts 94. Further, a discharge valve pilot bore 252 is provided through third block 88 for communicating with L-shaped recessed discharge valve pilot channel 208 of second block 86.

Viewing FIGS. 7a, 7b and 7c, the first and second sides 254 and 256 of fourth block 90 are depicted. As can be seen in FIG. 7b, a star shaped grouping of bores 258 and a square shaped grouping of bores 260 are defined through fourth block 90. Star shaped grouping of bores 258 comprises part of mode selector valve 262 which is depicted in FIG. 2a and square shaped grouping of bores 260 comprise a part of discharge initiating valve 264 in FIG. 2a.

Leaving second side 258 momentarily, and viewing first side 254 in FIG. 7a, there can be seen recessed first and second transfer channels 266 and 268, respectively, that provide fluid communication through appropriate bores defined hereinbelow, between mode selector valve 262 and discharge initiating valve 264. First side 256 also defines a recessed pilot vacuum channel 270. With the third block 88 and the fourth block 90 adjacently positioned, pilot vacuum bore 248 (FIG. 6a) communicates with recessed pilot vacuum channel 270.

Also defined by first side 254 of fourth block 90 is a recessed discharge valve pilot channel 272 which can communicate with discharge valve pilot bore 252 of third block 88, with the block 88 and 90 adjacently positioned. In addition, a recessed pilot channel 274 is provided in the first side 254, which recessed pilot channel 274 communicates with pilot bore 246 with, as indicated above, the first side 254 of fourth block 90 positioned adjacent the second side 214 of third block 88.

Again viewing the star-shaped grouping of bores 258 and the square-shaped grouping of bores 260, both provided through fourth block 90 (FIG. 7b), pilot vacuum bores 276, 278, 280, 282, and 284 are defined, which pilot bores 276 through 284 communicate with recessed pilot vacuum channel 270 defined by first side 254 of fourth block 90. Further, transfer bores 286 and 288 are provided through fourth block 90 in fluid communication with recessed second transfer channel 268 and additionally transfer bores 290 and 292 are provided through fourth block 90 and communicate with recessed first transfer channel 266.

Fourth block 90 also defines a plurality of atmospheric bores 294, 296, 298, 300, 302, and 304 which provide communication, respectively, with atmospheric bores 226, 228, 230, 232, 234, and 236 of third block 88 with blocks 88 and 90 adjacently positioned. Fourth block 90 defines a plurality of pilot bores 306, 308 and 310 which are placed in fluid communication with pilot bores 238, 240 and 242 when third block 88 is positioned adjacent fourth block 90. Also pilot bores 312, 314 and 316 are provided through fourth block 90 in communication with recessed pilot channel 274.

Fourth block 90 defines discharge valve pilot bores 318, 320 and 322 in fluid communication with recessed discharge valve pilot channel 272. Additionally, fourth block 90 defines a pilot bore 324 which communicates with pilot bore 244 with the second side 214 of third block 88 positioned adjacent the first side 256 of fourth block 90.

As can be seen in FIG. 7b, a recessed slot 326 is provided in the second side 256. Further a vacuum sensor valve bore 328 is defined by fourth block 90, which provides communication between the first side 254 thereof and recessed slot 326, and receives pin 129 (FIG. 2d). With fourth block 90 positioned adjacent third block 88, vacuum sensor valve bore 328 is provided in communication with vacuum sensor valve bore 218. Further bores 330 are provided through fourth block 90, said bores 330 provided for receiving machine bolts 94 therethrough. Finally, with blocks 88 and 90 adjacently positioned, wash valve pilot bore 327 of fourth block 90 communicates with pilot bore 244 of third block 88.

Fifth block 92 as depicted in FIGS. 8a, 8b, and 8c includes first side 332 and second side 334. Provided through fifth block 92 is a generally circular aperture 336 which is positionable adjacent the star-shaped group of bores 258 with the first side 332 of fifth block 92 positioned adjacent the second side 256 of fourth block 90. It is noted that circular aperture 336 includes a recessed arcuate portion 352 adjacent the upper portion thereof (FIG. 8b). As depicted on second side 334, the following markings are inscribed clockwise about recessed arcuate portion 352. The markings include "S" for the sampling mode, "M" for the milking mode, and "W" for the washing mode. Arcuate portion 352 extends to and ends beneath both the "S" and "W" mode indices. Circular aperture 336 receives a mode selector switch 338 which comprises a part of mode selector valve 262. Mode selector switch 338 (FIG. 2a) includes a generally circular base 340 and an upstanding handle 342 provided generally along a diameter of circular base 340.

In a preferred embodiment, mode selector switch 338 includes a rubber insert which covers the entire lower surface of base 340 and contacts fourth block 90 with the blocks in the above-indicated adjacent relationship. Insert 344 defines three generally oval indentations, 346, 348 and 350 (shown by broken lines in FIG. 2a) located beneath upstanding handle 342. Further it is noted that upstanding handle 342 extends into recessed arcuate portion 352 as can be seen in FIG. 2a. Thus it is noted that as the mode selector switch 338 is swiveled toward the "S" mode indicia, the upper portion of handle 342 is stopped by the end of recessed arcuate portion 352 such that handle 342 is pointingly directed toward the "S" mode indicia. Likewise with the mode selector switch 338 swiveled in a clockwise direction such that the upper portion of handle 342 is moved toward the "W" mode indicia, the other end of recessed arcuate portion 352 stops the upper portion of mode selectswitch 338 adjacent the "W" mode indicia. Further, as can be seen in FIG. 2a, the circular base 340 of mode selector switch 338 includes an indentation 354 positioned to receive a spring loaded detent 356, which detent 356 is mounted in fifth block 92 so as to releasably lock the mode selector switch 338 with the upper portion of handle 342 positioned adjacent the "M" mode indicia.

Referring to FIGS. 2a and 7b, with the handle 342 of mode selector switch 338 pointing toward the "S" mode indicia, oval indentation 346 places pilot vacuum bore 276 in fluid communication with pilot bore 310, oval indentation 348 places atmospheric bore 304 in fluid communication with wash valve bore 327, and oval indentation 350 places a discharge valve pilot bore 318 and pilot bore 312 and atmospheric bore 298 in fluid communication. With handle 342 positioned below the "M" mode indicia, first oval indentation 346 places transfer bore 292 in fluid communication with pilot bore 314, second oval indentation 348 places atmospheric bore 302 in fluid communication with wash valve bore 327 and third oval indentation 350 places discharge valve pilot bore 320 and pilot bore 306 and transfer bore 286 in fluid communication. Further with handle 342 positioned adjacent the "W" mode indicia, the first oval indentation 346 places atmospheric bore 300 in fluid communication with pilot bores 308, the second oval indentation 348 places pilot vacuum bore 280 in fluid communication with wash valve bore 327, and the third oval indentation 350 places discharge valve pilot bore 322 and pilot bore 316 and pilot vacuum bore 278 in fluid communication.

As previously indicated hereinabove, fifth block 92 also houses discharge initiating valve 264 (FIG. 2a). Discharge initiating valve 264 includes a rectangular slide 358 which is slidably mounted in a rectangular indentation 360 (FIG. 8a) in the first side 322 of fifth block 92.

Rectangular slide 358 includes a rectangular indentation 362 which is disposed adjacent the fourth block 90 as is readily evident in FIG. 2d. Rectangular indentation 362 accepts a rectangular insert 364 which defines first and second circular recesses 366 and 268 (FIG. 2a). First circular recess 366 is large enough such that as rectangular slide 358 is slidingly positioned in rectangular indentation 360 of fifth block 92, first circular recess 366 can selectively place (i) pilot vacuum bore 282 (FIG. 7b) in fluid communication with transfer bore 288 and also (ii) transfer bore 288 in fluid communication with atmosphere bore 296 with slide 358 in a first and a second position, respectively. Similarly, second circular recess 268 is large enough so that said recess 368 can selectively place (i) atmospheric bore 294 in fluid communication with transfer bore 290 and also (ii) transfer bore 290 in fluid communication with pilot vacuum bore 284 with slide 358 in the first and second positions, respectively. It is noted that rectangular slide 358 includes an upstanding pin 370 which projects through an oval aperture 372 defined in the first side 332 of fifth block 92 (FIG. 8a). With upstanding pin 370, rectangular slide 358 can be manually slid between the first position and the second position.

As can be seen in FIGS. 2a and 2d, discharge initiating valve 264 further includes a first leaf spring 374 disposed in an elongated slot 376 defined in fifth block 92, which elongated slot 376 communicates with rectangular indentation 360. As can be seen in FIG. 2a, first leaf spring 374 biases slide 358 to the second position thereof. Discharge initiating valve 254 further includes a bifurcated stop 378 which is pivotally mounted in slot 380 of fifth block 92 by a pin 382 (FIG. 2d). Further, a second leaf spring 384 is disposed in an elongate indentation 386 (FIG. 8a) defined by fifth block 92 and which is provided between rectangular indentation 360 and slot 380. Second leaf spring 384 contacts bifurcated stop 378. As can be seen in FIGS. 2d and 2e, bifurcated stop 378 is positionable between a first position (FIG. 2d) wherein rectangular slide 358 can be slidingly disposed between first and second elongated members 388 and 390, such that rectangular slide 358 is in the second position thereof. As can be seen in FIG. 2e, bifurcated stop 378 can be pivoted to a second position wherein first elongated member 388 prevents slide 358 from being disposed in the second position thereof, locking said slide 358 in the first position thereof. Further, as can be seen in FIG. 2e, second leaf spring 384 biases bifurcated stop 378 into the second position. Also as is evident in these figures, bifurcated stop 378 includes a sloping surface 392, which extends from fifth block 92, and which can be used to manually lever bifurcated stop 378 to the first position. Also as can be seen in FIGS. 2d and 2e, recessed slot 326 of fourth block 90 receives second elongated member 398 of bifurcated stop 378. Further as can be seen in FIGS. 2d and 2e, vacuum sensor valve bore 328 communicates with vacuum sensor valve bore 218 both receiving pin 129. As will be discussed with the operation of the invention, when a vacuum is created in vacuum sensor valve 198 with rectangular slide 358 in the first position, pin 127 does not extend into recessed slot 326, and thus bifurcated stop 378 can be urged by spring 384 into the second position (FIG. 2e) locking slide 358 in the first position.

Also as can be seen in FIG. 2a, an elongated pin 396 is disposed in a bore 398 of fifth block 92. In a first position, elongated pin 396 is received in an indentation 400 of slide 358, locking slide 358 is in the first position, thus allowing, as will be later dicussed, collection jar 26 to be manually drained of, for example, contaminated milk or cleaning solution. In a second position, as shown in FIG. 2a, pin 396 is partially removed from bore 398 such that pin 396 is no longer received in indentation 400 of slide 358.

Also as can been seen in FIGS. 2a through 2d, a sleeve 402, which in a preferred embodiment is comprised of elastomeric material, is disposed about exterior surface of vacuum conduit 102 for purposes of providing a sealing contact with collection jar 24.

MILKING APPARATUS DISCHARGE VALVE

With reference to FIGS. 3a through 3c, discharge valve 26 is depicted. Discharge valve 26 includes a cylindrical body 404 which defines an internal cylindrical passageway 406 which has a tapered portion 408 in fluid communication with a sampling port 410 also defined by body 404. The end of cylindrical body 404 located distally from sampling port 410 defines an aperture which communicates with passageway 406 and which is adapted to receive a discharge passageway 414 (FIG. 1) of collection jar 24. Further as can be seen in FIG. 1, a retention mechanism 416 is provided for lockingly retaining discharge valve 26 to collection jar 24. The retention mechanism 416 is secured about an annular flange 418 defined by cylindrical body 404 adjacent aperture 412 (FIG. 3c).

Cylindrical body 404 further defines a cylindrical portion 420 which defines a bore 422, which bore 422 is in fluid communication with sampling port 410. Slidingly disposed about cylindrical portion 420 is an annulus 424. A flexible annular boot member 426 is disposed about annulus 424 and the outer portion of cylindrical body 404 adjacent sampling port 410. Further, annular boot member 426, which as can be seen in FIG. 3c has a generally V-shape cross-section, is removably received in annular grooves defined by annulus 424 and cylindrical body 404.

Flexible annular boot member 426 can comprise, for example, an elastomeric material. Further, it can be seen that a chamber 428 is defined by boot member 426 and cylindrical body 404 and annulus 424. Providing communication with chamber 428 is a vacuum bore 430 (FIG. 3a) which communicates with a conduit 432 extending radially from cylindrical body 404. As can be seen in FIG. 1, conduit 432 is so sized that drain vacuum conduit 32 can be slipped thereover. Further (FIG. 3c) an annular U-cup O-ring 434 having a generally U-shaped cross-section is disposed in an annular groove of annulus 424 in sliding contact with the outer surface of cylindrical portion 420. In a preferred embodiment, annular U-cup O-ring 434 is comprised, for example, of an elastomeric material.

Disposed in bore 422 is a plug 436 which has an upper end with beveled edges, which upper end can be received in sampling port 410 to plug such port. The lower end of plug 436 is bifurcated and said bifurcated end receives a retaining pin or bail 438, the ends of which pin 438 are secured in opposing bores provided in annulus 424. It is noted that in an alternate embodiment plug 436 can be replaced by a ball valve arrangement (not shown) if a greater flow of fluid through sampling valve 419 is desired.

Discharge valve 26, which in a preferred embodiment is comprised of stainless steel, further includes a discharge line 440 which is disposed transversely to cylindrical body 404, as can be seen in FIG. 3c, an extending end 442 of discharge line 440 extends through the wall of cylindrical body 404 and is adapted to receive discharge line 64 slid thereover, as can be seen in FIG. 1. The opposite end 444 of discharge line 440 is placed in fluid communication with a conduit 446 defining a sensor orifice 445 which extends through the outer wall of cylindrical body 404. Conduit 446 is adapted to receive sensor vacuum conduit 30 (FIG. 1) slidingly disposed thereover. Contacting the opposite end 444 of discharge line 440 is a discharge diaphragm 448, which in a preferred embodiment is comprised of elastomeric material, which diaphragm 448 is disposed in a bore 451 defined by a transverse cylindrical body 450 and extending transversely from cylidrical body 404, which transverse cylindrical body 450 is concentric with discharge line 440. It is noted that diaphragm 448 is retained in cylindrical body 450 by an annular flange 454 on one side and a plug 456 slidingly disposed in the bore 451 of cylindrical body 450 on the other side. Further, a retaining ring 458 is springingly received in an annular groove defined by bore 451 for retaining plug 456 abuttingly against diaphragm 448. As can be seen in FIG. 3c, plug 456 defines a recess 460 adjacent discharge valve diaphragm 448. Recess 460 is generally circular in configuration and has a diameter which is larger than the internal diameter of discharge line 440. The diameter of recess 460 is substantially identical to the diameter defined by annular flange 454. Further, plug 456 defines a bore 462 which communicates with a conduit 464 extending from plug 456. Conduit 464 is adapted to receive discharge valve vacuum conduit 28 (FIG. 1).

As can be seen in FIG. 3e, in a first position diaphragm 448 blocks communication between passageway 406 and discharge line 440. As will be described in much fuller detail hereinbelow, when vacuum is provided to recess 460, diaphragm 448 is drawn therein, providing fluid communication between passageway 406 and discharge line 440.

Operation of the Milking Apparatus

Referring to FIG. 9a, a first condition of the milking operation of the milking apparatus is schematically depicted. At the outset it is noted that in FIG. 9a and also in FIGS. 9b, 9c, 10a, 10b, and 11, that only pilot vacuum and atmospheric lines are shown and that the circles represent the indicated numbered valves which receive said pilot vacuum and atmospheric pressure. The first vacuum pump 34 and the second vacuum pump 68 (FIG. 1) pull a vacuum of, for example, 10" $H_g$ and 15" $H_g$, respectively, and with valve 39 positioned to communicate line 38 and line 73, both main vacuum supply line 38 and pilot vacuum supply line 40 plus discharge line 64 are exposed to the vacuum of 15" $H_g$. In the first condition, wherein the milking apparatus is ready to receive milk from the claw unit 50, the mode selector switch 338 is positioned in the "M" milking mode and the discharge initiating valve 264 is biased to the second position such that rectangular slide 358 is received between the first and second elongated members 338 and 390 of bifurcated stop 378. With the controller unit 22 so conditioned, the following series of events occurs.

First vacuum from the pilot vacuum supply line 40 is supplied to the controller unit 22 and from controller unit 22 goes through drain vacuum conduit 32 to the sampling valve 419, and also through the appropriate connecting ports and channels as previously described in the specification of the discharge initiating valve 264 and directly to the mode selector valve 262. However, none of the ports which are placed in fluid communication when the mode selector switch 338 of valve 262 is placed in the "M" milking mode are connected directly to pilot vacuum supply line 40. But, vacuum supplied to the discharge initiating valve 264 is in turn supplied to the mode selector valve 262 via a recessed first transfer channel 266, which channel 266 is placed in fluid communication with pilot bore 314 by mode selector switch 338. From pilot bore 314 fluid communication is provided to vacuum re-entrant valve 103. Vacuum re-entrant valve 103 controls the main supply of vacuum through main vacuum supply line 38 to and through controller unit 22 to collection jar 24. Pilot vacuum from bore 314 of the mode selector valve 262 is supplied to first circular recess 156 of re-entrant valve 103 (FIG. 2b) and draws diaphragm member 162 therein and away from the end of vacuum conduit 198 which extends into re-entrant valve 103, thereby allowing vacuum from the main vacuum supply line 38 to enter re-entrant valve 103 and be placed in fluid communication with collection jar 24 through vacuum conduit 102 (FIG. 4c). It is noted that owing to the design of the re-entrant valve 103, the cross-sectional area of first circular recess 156 is much greater than the internal cross-sectional area of vacuum conduit 98. Thus, with equivalent vacuums acting on either side of diaphragm 162, owing to this area difference, diaphragm 162 will always be pulled into first circular recess 156 and thus open re-entrant valve 103 to the main vacuum supply line 38.

Through filter 116 controller unit 22 is placed in fluid communication with atmospheric pressure. From filter 116 atmospheric pressure is provided to discharge initiating valve 264 and from there through recessed second transfer channel 268 to mode selector valve 262. Mode selector valve 262 places atmospheric pressure in fluid communication with discharge valve 26, through discharge valve vacuum conduit 28 (FIG. 1), and also with atmospheric valve 104. Considering discharge valve 26 first and viewing FIG. 3c, it can be seen that with atmospheric pressure provided thereto, and in particular to recess 460 thereof, diaphragm 448 is forced into a blocking relationship with discharge line 440 by, for example, a vacuum of 15" H$_2$ provided in discharge line 440 by second vacuum pump 68. Thus, any milk received in collection jar 24 will be retained therein, said milk being unable to pass through discharge valve 26. As previously indicated, atmospheric pressure is provided through mode selector valve 262 to atmospheric valve 104. As can be seen in FIGS. 2b and 4c, this pilot atmospheric pressure from mode selector valve 262 is provided to recess 166. Owing to the construction of atmospheric valve 104, with pilot atmospheric pressure in recess 166, diaphragm 174 closes atmospheric valve 104, preventing atmospheric pressure, provided from filter 116 through first bore 106 to atmospheric valve 104, from communicating with vacuum conduit 102 and thus with the collection jar 24.

Pilot atmospheric pressure from filter 116 and through atmospheric bore 147 is also provided via recessed atmospheric surface channel 200 (FIG. 5b) through atmospheric bore 234 and 302 directly to mode selector valve 262 and through mode selector switch 338 to wash valve 118 (see FIGS. 2c, 4b and 5a). This pilot atmospheric pressure is supplied by bore 180 to third circular recess 176 of wash valve 118. With atmospheric pressure so supplied, diaphragm member 188 is allowed to remain in blocking contact with bores 120 and 122 so as to block fluid communication between vacuum conduit 120 (FIG. 4c) and sensor vacuum conduit 30 (FIG. 1). It is noted that the significance of wash valve 118 will become more apparent hereinbelow in the discussion of the wash condition for the milking apparatus.

As diaphragm line 440 is exposed to a vacuum of 15" H$_g$ provided by second vacuum pump 68, sensor orifice 445 provided in fluid communication with discharge line 440 (FIG. 3c) is also exposed to said vacuum. Further as sensor orifice 445 is provided in fluid communication with vacuum sensor valve 198 (FIG. 2b) via sensor vacuum conduit 30, sensor valve 198 is also provided with said vacuum. Thus the planar middle portion 224 of flexible sensor diaphragm 220 and disc 125 are pulled down, away from third block 88, (FIG. 2e). When a vacuum is not provided to valve 198, diaphragm 220 and in particular planar middle portion 223 thereof and disc 125 will assume the position as depicted in FIGS. 2b and 2d such that the middle planar portion 224 is in contact with third block 88. The sensitivity of valve 198 to a vacuum signal from sensor orifice 445 can, as previously indicated, be adjusted by knurled knob 132, which knob 132 adjusts the compression of spring 127.

As has been previously discussed, the vacuum which is supplied through the controller unit 22 to the collection jar 24 draws milk from the cow through the claw unit 50. As the flow of milk from the cow diminishes to a predetermined rate, as for example, one half pound of milk per minute, it is important to reduce the vacuum in collection jar 24, and thus in claw unit 50 so that udder disorders are prevented. Such diminution of the vacuum is accomplished by the flow meter 46 which senses the predetermined rate of flow of milk through the claw unit 50 and (1) activates a flashing light 62 to warn the operator of the end of milking cycle and (2) signals vacuum selector valve 39 to provide line 38 in communication with line 37 and thus to supply 10" H$_g$ to collection jar 26 instead of 15" H$_g$, so as to avoid udder disorders. Further, after a predetermined interval, generally in the range of twenty to twenty-five seconds, after light 62 begins to flash, the milking of the cow is, in most cases, at an end and arm member 51 swings past, disconnects and collects teat cups 52 from the cow. With 10" H$_g$ in claw unit 50, teat cups 52 just barely remain secured to the cow, thus minimal effort need be expended by arm 51 to remove cups 52.

The operator then physically contacts upstanding pin 370 and thereby slides rectangular slide 358 (FIG. 2a) into the first position. As can be seen in FIG. 2e with rectangular slide 358 in the first position, second leaf spring 384 urges bifurcated stop 378 downwardly to a position against pin 129 such that first elongated member 388 thereof latches rectangular slide 358 in the first position. With rectangular slide 358 in the first position, the milking apparatus is in the second condition (FIG. 9b) such that milk can now be removed from collection jar 24 through discharge valve 26 in the following manner. As rectangular slide 358 is in the first position, pilot bore 314 of mode selector valve 262 is placed in fluid communication with atmospheric bore 294, which supplies atmosphere to discharge initiating valve 264, via transfer bore 290 and recessed first transfer channel 266. Thus, atmospheric pressure is provided to first circular recess 156 of re-entrant valve 103. With atmospheric pressure in first circular recess 156, diaphragm member 162 is drawn by the vacuum in conduit 98 into a contacting, sealing relationship with conduit 98. Consequently, the communication of vacuum from main vacuum supply line 38 to collection jar 24 is blocked by re-entrant valve 103.

Simultaneously, pilot vacuum bore 282 of discharge initiating valve 264 is placed in fluid communication with transfer bore 288 and thus vacuum is supplied to pilot bore 306 and discharge valve pilot bore 320 of second mode selector valve 262 via recessed second transfer channel 268 and transfer bore 286. Thus it is evident that a pilot vacuum of 15" $H_g$ is supplied to atmospheric valve 104 and discharge valve 26.

As can be seen in FIGS. 2b, 4c and 5a with pilot vacuum supplied to atmospheric valve 104, diaphragm member 174 is pulled into second circular recess 166 by said pilot vacuum. With diaphragm member 178 drawn into second circular recess 166, atmosphere can be provided through filter 116 and first bore 106, through vacuum conduit 102 to collection jar 24 and thereby bringing collection jar 24 to atmospheric pressure.

Further, as pilot vacuum is provided from controller unit 22 through discharge valve vacuum conduit 28 to discharge valve 26, diaphragm 448 (FIG. 3c) is drawn into recess 460 thereby providing fluid communication between passageway 406 and discharge line 440 such that the vacuum of 15" $H_g$ in discharge line 440 draws the milk through discharge line 64 into receiving jar 66, said milk then being supplied to holding tanks (not shown) by a filtering and cooling pumping system 70 (FIG. 1). It is to be understood that diaphragm 448 can be drawn into recess 460 when pilot vacuum of 15" $H_g$ is supplied thereto even though a vacuum of 15" $H_g$ is acting on the opposite side of diaphragm 448 as supplied through discharge line 440, owing to the area effect previously described. That is to say that the cross-sectional area of recess 460 is larger than the cross-sectional area of discharge line 440 and thus the force drawing diaphragm 448 into recess 460 is greater than the force drawing diaphragm 448 into sealing contact with discharge line 440.

As milk flows through discharge line 440, the vacuum sensed by sensing orifice 445 is reduced and as shown in condition 2 (FIG. 9b) is approximately 6" $H_g$ during the initial removal stage of milk from collection jar 24. The distance between the end of discharge line 440 and diaphragm 448 with said diaphragm in the fully open position is calculated to provide the 6" $H_g$ of vacuum to sensing orifice 445 as fluid flows through line 440. It is noted that as sensing orifice 445 is provided in fluid communication with disc 125 and flexible sensor diaphragm 220 of vacuum sensor valve 198 that said disc 125 and sensor diaphragm 220 are held in the down position away from third block 88 (FIG. 2e).

Momentarily after the milk has been completely drained from collection jar 24 and has just cleared the end of discharge line 444 adjacent diaphragm 448 so that the sensor orifice 445 is placed in fluid communication with the atmospheric pressure in the collection jar 24, such atmospheric pressure is provided through sensor vacuum conduit 30 to valve 198 and thus spring 127 urges disc 125 and diaphragm 220 to the normal up position as depicted in FIGS. 2b and 2d such that the planar middle portion 224 thereof is in intimate contacting relationship with third block 88 so as to urge pin 129 and thus stop 378 upwardly. As bifurcated stop 378 is urged upwardly against second leaf spring 384, rectangular slide 358 is unlatched and allows first leaf spring 374 to urge rectangular slide 358 into the second position thereof with said slide 358 disposed between first and second elongated members 388 and 390 of bifurcated stop 378 (FIG. 2d). Thus in condition three as depicted in FIG. 9c, vacuum re-entrant valve 103 is just beginning to open so as to place the main vacuum supply line 38 in fluid communication with collection jar 24 bringing collection jar 24 to a vacuum of 15" $H_g$, valve 39 having previously again established fluid communication between lines 38 and 73 (FIG. 1). Also as is evident from FIG. 9c, atmospheric valve 104 is closing so as to block the communication of atmospheric pressure to collection jar 24. Further discharge valve 26 is also just closing, preparatory to the milking of another cow. Once a steady state condition has been reached following condition three, the milking apparatus is again ready to receive milk from a cow through claw unit 50 and thus is again in condition one (FIG. 9a). As vacuum is again supplied to sensing orifice 445 by second vacuum pump 68, the planar middle portion 224 of flexible sensor diaphragm 220 and disc 125 are pulled down into circular recess 194.

It is important to note that as the milking apparatus is again in condition one, that the diaphragm 448 blocks discharge line 440 and thus prevents the vacuum from second vacuum pump 68 from coming in fluid communication with collection jar 24. That being the case, a vacuum from second vacuum pump 68 does not interfere with the orderly operation of flow meter 46 which flow meter 46 reduces the amount of vacuum in collection jar 24 by means of valve 39 as the milking cycle for each cow comes to an end. As had been previously noted, during the end of the milking cycle of a cow, it is important to reduce the vacuum in collection jar 24 to about 10" $H_g$ or less, so as to not irritate the cow's udder and thereby cause udder disorders. Thus it can be seen with discharge valve 26 closed, the vacuum supplied by the second vacuum pump 68, which is at 15" $H_g$, does not mix with the vacuum in collection jar 24 which is at approximately 10" $H_g$ so as to increase the vacuum provided to the claw unit 50 and thus irritate the cow during the last portion of the milking cycle.

Furthermore, as sensor orifice 445 causes discharge valve 26 to close immediately after milk passes sensor orifice 445, slugs of air from collection jar 24 are not drawn through discharge line 64 at a high rate of speed and thus are not discharged into receiving jar 66 to spin around at a high rate of speed therein. Thus receiving jar 66 does not overflow.

As can be appreciated, with the above-indicated automatic operation of the milking apparatus, there is no need for an operator to shut off and open appropriate valves so that the milking apparatus can proceed from condition two to condition three and back to condition one, said process being carried out automatically. Thus, it can also be seen that there is a saving in operator's time of as much as 20% or 30%, plus the removal of any possibility of operator error in not closing discharge valve 26 prior to the beginning of the next milking cycle.

Sampling

Every 30 days, or more often as is deemed necessary, the milk which is collected in the collection jar 24 must be sampled. In preparation for sampling, (see condition four, FIG. 10a) and after the milk has been collected in collection jar 24 such that the vacuum conditions and the state of the valves in the milking apparatus is substantially identical to the condition one (FIG. 9a), sampling valve 419 is manually opened by placing pressure on boot 426 so as to counteract the vacuum provided therein and so as to extend cylindrical portion 420 downwardly, removing plug 436 from sampling port 410. Thus, air is allowed to bubble through sampling port 410 into collection jar 24 so as to mix the cream uniformly in the milk as collected in collection jar 24.

To take a sample, the operator then places the mode selector valve 262 in the "S" sampling mode (see condition five in FIG. 10b). In this mode, the mode selector valve 262 does not place the vacuum and atmospheric pressure provided thereto by discharging initiating valve 264 in communication with any of the other bores of mode selector switch 338. However, atmospheric pressure provided directly to mode selector valve 262 through atmospheric bores 298 and 304 is provided to pilot bore 312, discharge valve pilot bore 318, and wash valve bore 327. Thus atmospheric pressure is provided to re-entrant valve 103 so as to interrupt fluid communication between first vacuum pump 34 and collection jar 24, atmospheric pressure is provided to wash valve 118 so as to prevent fluid communication between sensor orifice 445 through sensor vacuum conduit 30 to collection jar 34, and atmospheric pressure is provided to discharge valve 26 so as to sealingly close discharge line 440. Furthermore, pilot vacuum at 15" $H_g$ is provided to mode selector valve 262 through pilot vacuum bore 276 and placed in fluid communication with atmospheric valve 104 such that atmospheric valve 104 is opened, allowing atmospheric pressure to enter collection jar 24, so that collection jar 24 can be brought to atmospheric pressure. Once collection jar 24 is at atmospheric pressure, a sample of the milk in collection jar 24 can be obtained by squeezing boot 426 of sampling valve 419, allowing milk to flow therethrough under the influence of gravity into a sample bottle. Once the sampling has been completed, the mode selector valve 262 is turned to the "M" milking mode, the fluid control valve system 20 returns to the state of condition one, and milk can then be removed from collection jar 24 into receiving jar 66 by sliding rectangular slide 358 into the first position as described hereinabove such that the milking apparatus proceeds from condition two automatically to condition three and back to condition one.

Washing

For purposes of the in-place-washing of the system 20, the mode selector valve 262 is placed in the "W" washing position, so as to place said system 20 in condition six (FIG. 11). In the washing mode, atmospheric pressure and vacuum supplied to mode selector valve 262 by discharge initiating valve 264 is not provided in fluid communication with any of the other bores in mode selector valve 262. However, atmospheric pressure supplied directly to mode selector valve 262 by atmospheric bore 300 is provided through valve 262 to atmospheric valve 104, closing valve 104 to the atmosphere.

Pilot vacuum supplied directly to mode selector valve 262 by pilot vacuum bores 278 and 280 is placed in fluid communication with pilot bore 316, discharge valve pilot bore 322 and wash valve bore 327. Thus pilot vacuum provided to discharge valve 26 draws diaphragm 448 into circular recess 460 providing fluid communication between passageway 406 and discharge line 440. Additionally, pilot vacuums supplied to re-entrant valve 103 allows communication to be maintained between the first vacuum pump 34 and collection jar 24. Also, pilot vacuum supplied to wash valve 118 allows sensor vacuum conduit 30 to be in fluid communication with collection jar 24.

Next, a wash conduit 80 which includes a washing boot 78 at the end thereof is slippingly disposed about boot 426 of sampling valve 419 so as to open sampling valve 419 and allow wash solution from wash unit 72 to be drawn through discharge valve 26 into collection jar 24. Further washing fluid is drawn through sensor orifice 445, through sensor vacuum conduit 30, and through wash valve 118 into collection jar 24. It is also noted that wash unit 72 is provided in fluid communication with first and second vacuum lines 35 and 69, respectively, through conduit 74 and opened valve 76 for providing washing solution through re-entrant valve 103 and through vacuum conduit 102. Also, it is to be appreciated that as check valves 36 and 71 are closed so as to protect pumps 34 and 68 from the washing solution, washing solution is drawn through re-entrant valve 103 by the vacuum created in collection jar 24 by second pump 68 acting through discharge valve 26. Proceeding through controller unit 22 the wash solution is deflected by the deflector 150 positioned at the end of vacuum conduit 102 such that washing solution washes the inside top of the collection jar 24. It is to be noted that during washing, the teat cups 52 of claw unit 50 are placed in a container of washing solution so that said solution may be drawn through claw unit 50 into collection jar 24.

Thus, all the milk contacting surfaces of system 20 are cleaned in place by the drawing of said cleaning solution through system 20 as described hereinabove. The cleaning solution is removed from the system 20 in much the same way that milk is removed from receiving jar 66. At the conclusion of the washing cycle, and once washing solution has been removed from collection jar 24, the washing boot 78 of wash conduit 80 is removed from the sampling valve 419 and the vacuum pumps are shut off. The sampling valve 419 then opens automatically and all the residual wash solution in system 20 is allowed to drain on the floor of the milking parlor.

It is to be understood that a plurality of systems including controller units 22, collection jars 24, discharge valves 26 and claw units 50 can be provided in fluid communication with first and second vacuum lines 35 and 69.

In an alternate embodiment (not shown) the dual vacuum first and second pumps 34 and 68 of the above described system are replaced by a single vacuum pump such as pump 68 which supplies 15" $H_g$ directly to lines similar to main vacuum supply line 38, pilot vacuum supply line 40 and third vacuum line 77 in exactly the same manner as previously described (FIG. 1). A flow meter is provided which includes a modified version of flow meter 46, which flow meter blocks the communication of vacuum from a collection jar, such as jar 24, to teat cups such as cups 52, when the flow of milk from the cow has reached a predetermined level such as one-half pound per minute. Thus, with no vacuum supplied to the teat cups, udder disorders are prevented and also an arm mechanism, similar to arm 51 can then quite easily remove the teat cups from the cow.

Other than the above-indicated differences, the milking, sampling and washing operations of the single pump fluid control valve system are identical to the dual pump fluid control valve system 20.

Although an exemplary embodiment of the apparatus of the invention has been described hereinabove, it is to be understood that one skilled in the art could make modifications thereof in accordance with the spirit and scope of the above disclosure.

I claim:

1. A vacuum control valve system including:
a valve system body which defines a first vacuum conduit communicating with a source of vacuum, and a first atmospheric conduit communicating with the atmosphere;
said valve system body further defining a second vacuum conduit and a second atmospheric conduit;
said first and second vacuum conduits defined by said body being out of fluid communication with said first and second atmospheric conduits defined by said body;
a first valve means for selectively providing communication between the first and second vacuum conduits;
a second valve means for selectively providing communication between the first and second atmospheric conduits;
a third valve means;
said valve system body defining a third vacuum conduit provided in communication with the third valve means and communicating with the source of vacuum and a third atmospheric conduit provided in communication with the third valve means and communicating with the atmosphere;
a fourth conduit for providing communication between the third valve means and the first valve means and a fifth conduit for providing communication between the third valve means and the second valve means;
wherein the third valve means has a first mode for providing communication between the fourth conduit and the third atmospheric conduit and between the fifth conduit and the third vacuum conduit; and
wherein the third valve means has a second mode for providing communication between the fourth conduit and the third vacuum conduit, and between the fifth conduit and the third atmospheric conduit.

2. The apparatus of claim 1 wherein with atmosphere supplied through said fourth conduit to said first valve means, said first vacuum conduit is provided out of communication with said second vacuum conduit, and with vacuum supplied through said fifth conduit to said second valve means, said first atmospheric conduit communicates with said second atmospheric conduit; and wherein with vacuum supplied through said fourth conduit to said first valve means, said first vacuum conduit is provided in communication with said second vacuum conduit, and with atmosphere supplied through said fifth conduit to said second valve means said first atmospheric conduit is provided out of communication with said second atmospheric conduit.

3. The apparatus of claim 1 wherein said first valve means includes a re-entrant cavity and a first flexible member mounted therein for selectively providing communication between the first and second vacuum conduits, and
wherein said second valve includes a second flexible member for selectively providing communication between the first and the second atmospheric conduits.

4. The apparatus of claim 1 wherein said third valve means is a discharge initiating valve;
said apparatus further including a mode selector valve means for selectively choosing among a milking mode, a sampling mode and a washing mode;
wherein said fourth conduit includes a first transfer conduit for providing fluid communication between said discharge initiating valve and said mode selector switch valve, and a first pilot conduit for providing fluid communication between said mode selector valve means and said first valve means;
wherein said fifth conduit includes a second transfer conduit for providing fluid communication between said discharge initiating valve and said mode selector valve means and a second pilot conduit for providing fluid communication between said mode selector valve means and said second valve means;
said mode selector valve means in the milking mode providing fluid communication between said first transfer conduit and said first pilot conduit and providing fluid communication between said second transfer conduit and said second pilot conduit.

5. The apparatus in accordance with claim 4 including:
a seventh conduit adapted to provide fluid communication between said mode selector valve means and the source of vacuum and an eighth conduit adapted to provide fluid communication between said mode selector valve means and the atmosphere;
said mode selector switch in the sampling mode providing fluid communication between said seventh conduit and said second pilot conduit such that said first and second atmospheric conduit are provided in fluid communication by said valve means and providing fluid communication between said eighth conduit and said first pilot conduit such that said first and second vacuum conduit are placed out of communication by said first valve means.

6. The apparatus in accordance with claim 4 including:
a seventh conduit adapted to provide fluid communication between said mode selector valve means and the source of vacuum and an eighth conduit adapted to provide fluid communication between said mode selector valve means and the atmosphere;
said mode selector switch in the washing mode providing fluid communication between said seventh conduit and said first pilot conduit such that said first and second vacuum conduit are provided in communication by said first valve means, and providing fluid communication between said eighth conduit and said second pilot conduit such that said first and second atmospheric conduits are provided out of communication by said second valve means.

7. The apparatus of claim 6 including a fourth wash valve means which is selectively conditioned to provide fluid communication between a sensor conduit and said second vacuum conduit with said mode selector switch in the washing mode.

8. The apparatus of claim 1 further including a mode selector valve having at least a sampling mode and a washing mode, wherein said first and second vacuum conduits are provided out of fluid communication and said first and second atmospheric conduits are provided in fluid communication with said mode selector valve in the sampling mode and wherein said first and second vacuum conduits are provided in fluid communication and said first and second atmospheric conduits are provided out of fluid communication with said mode selector valve in the washing mode; and wherein said mode selector valve in the sampling and washing modes block said fourth and fifth conduits.

9. A vacuum control valve system including:
- a valve system body which defines a first vacuum conduit adapted to communicate with a source of vacuum, and a first atmospheric conduit adapted to communicate with the atmosphere;
- said valve system body further defining a second vacuum conduit and a second atmospheric conduit;
- a first valve means for selectively providing communication between the first and the second vacuum conduits;
- a second valve means for selectively providing communication between the first and the second atmospheric conduits;
- a third valve means;
- said valve system body defining a third vacuum conduit provided in communication with the third valve means and adapted for communicating with the source of vacuum and a third atmospheric conduit provided in communication with the third valve means and adapted for communicating with the atmosphere;
- a fourth conduit for providing communication between the third valve means and the first valve means and a fifth conduit for providing communication between the third valve means and the second valve means;
- wherein the third valve means has a first mode for providing communication between the fourth conduit and third atmospheric conduit and between the fifth conduit and the third vacuum conduit;
- wherein the third valve means has a second mode for providing communication between the fourth conduit and the third vacuum conduit, and between the fifth conduit and the third atmospheric conduit;
- said third valve means being releasably lockable in the first mode; and biased to the second mode; and
- said valve system body defining a sixth signal conduit in communication with said third valve means; and
- actuation means for releasing said third valve from the first mode, which actuation means is disposed in said sixth signal conduit means.

10. The apparatus of claim 9 wherein said actuation means includes a pin.

11. The apparatus of claim 9 wherein said third valve means includes a spring biased slide and a locking element movably mounted to the valve system body, said slide selectively slidable into the first mode for providing communication between the fourth conduit and the third atmospheric conduit and between the fifth conduit and the third vacuum conduit, and into the second mode so as to provide communication between the fourth conduit and the third vacuum conduit; and
wherein said locking element is selectably positionable between a first position so as to allow said slide to be springingly urged into the second mode and a second position so as to releasably lock said slide in the first mode.

12. The apparatus of claim 9 wherein said locking element is spring biased to the second mode and wherein said sixth signal conduit is provided in communication with said locking element, vacuum in said sixth vacuum conduit pulling said locking element into the second position.

13. The apparatus of claim 9 wherein said valve system body defines a chamber;
the apparatus further including a flexible member mounted in said chamber, which flexible member partitions said chamber into a first compartment and a second compartment,
said sixth signal conduit in communication with said first compartment,
wherein said valve system body defines a seventh vacuum conduit which communicates with said second compartment and which is adapted to communicate with the source of vacuum.

14. The apparatus of claim 13 further including adjustable spring means for urging said flexible member into the first compartment such that said actuation means releases said third valve from the first mode.

* * * * *